US011197294B2

(12) United States Patent
Sun et al.

(10) Patent No.: US 11,197,294 B2
(45) Date of Patent: Dec. 7, 2021

(54) SYNCHRONIZATION SIGNAL BLOCK AND REMAINING MINIMUM SYSTEM INFORMATION INTEGRATION IN UNLICENSED SYSTEMS

(71) Applicant: QUALCOMM Incorporated, San Diego, CA (US)

(72) Inventors: Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/542,196

(22) Filed: Aug. 15, 2019

(65) Prior Publication Data

US 2020/0059927 A1 Feb. 20, 2020

Related U.S. Application Data

(60) Provisional application No. 62/719,552, filed on Aug. 17, 2018.

(51) Int. Cl.
*H04W 4/00* (2018.01)
*H04W 72/04* (2009.01)
(Continued)

(52) U.S. Cl.
CPC ....... *H04W 72/0446* (2013.01); *H04J 3/1694* (2013.01); *H04W 48/12* (2013.01); *H04W 56/001* (2013.01); *H04W 72/10* (2013.01)

(58) Field of Classification Search
None
See application file for complete search history.

(56) References Cited

U.S. PATENT DOCUMENTS

| 2019/0104500 A1* | 4/2019 | Reial | H04L 5/0091 |
| 2019/0150121 A1* | 5/2019 | Abdoli | H04L 5/0092 |
| | | | 370/329 |

(Continued)

OTHER PUBLICATIONS

"3rd Generation Partnership Project; Technical Specification Group Radio Access Network; NR; Physical layer procedures for control (Release 15)", 3GPP Standard, Technical Specification, 3GPP TS 38.213, 3rd Generation Partnership Project (3GPP), Mobile Competence Centre; 650, Route Des Lucioles; F-06921 Sophia-Antipolis Cedex, France, vol. RAN WG1, No. V15.2.0, Jun. 29, 2018 (Jun. 29, 2018), pp. 1-99, XP051474490, [retrieved on Jun. 29, 2018], section 7.1.1, section 8.1, section 9.3, pp. 32-33, table 8.1_1, section 10-10.1; p. 66-p. 69; tables 10.1-1.

(Continued)

*Primary Examiner* — Clemence S Han
(74) *Attorney, Agent, or Firm* — Liem T. Do

(57) ABSTRACT

Methods, systems, and devices for wireless communications are described. A base station and user equipment (UE) may implement techniques to integrate remaining minimum system information (RMSI) and synchronization signal block (SSB) delivery in a shared radio frequency spectrum band. For example, the base station may transmit SSBs and corresponding RMSI transmissions in a same transmission opportunity (TxOP) and configure resource allocations to reduce or eliminate transmission gaps. For example, the SSBs and the corresponding RMSI transmissions may be transmitted after a single, successful listen-before-talk (LBT) procedure. For each SSB, the associated RMSI control resources and RMSI shared channel resources may be nearby or continuous in time such that the SSB, control resource set, and the RMSI downlink shared channel signal are transmitted as a package.

26 Claims, 26 Drawing Sheets

(51) Int. Cl.
*H04J 3/16* (2006.01)
*H04W 48/12* (2009.01)
*H04W 56/00* (2009.01)
*H04W 72/10* (2009.01)

(56) References Cited

U.S. PATENT DOCUMENTS

| | | | |
|---|---|---|---|
| 2019/0200307 A1* | 6/2019 | Si | H04L 27/0014 |
| 2019/0215216 A1* | 7/2019 | Abdoli | H04L 27/2675 |
| 2020/0154376 A1* | 5/2020 | Ko | H04L 5/0044 |
| 2020/0252916 A1* | 8/2020 | Abdoli | H04L 5/0092 |
| 2021/0028901 A1* | 1/2021 | Hakola | H04L 5/0048 |
| 2021/0037488 A1* | 2/2021 | Ko | H04W 72/0453 |
| 2021/0045144 A1* | 2/2021 | Kim | H04W 56/001 |
| 2021/0051683 A1* | 2/2021 | Li | H04L 41/0806 |

OTHER PUBLICATIONS

Intel Corporation: "Enhancements to NR DL Signals and Channels for Unlicensed Operation", 3GPP Draft; R1-1808683 AI7.2.2.3.1 DRS, 3rd Generation Partnership Project (3GPP), Mobile Competence Centre, 650, Route Des Lucioles, F-06921 Sophia, vol. RAN WG1, No. Gothenburg, Sweden; Aug. 20, 2018-Aug. 24, 2018 Aug. 11, 2018, XP051516058, Retrieved from the Internet: URL:http://www.3gpp.org/ftp/tsg%5Fran/WG1%5FRL1/TSGR1%5F94/Docs/R1%2D1808683%2Ezip [retrieved on Aug. 11, 2018] section 2, section 2.3; figure 2, 9 pages.
ITL: "Initial Access and Mobility for NR-U", 3GPP Draft; R1-1807142_NR-U_Initial Access and Mobility, 3rd Generation Partnership Project (3GPP), Mobile Competence Centre, 650, Route Des Lucioles, F-06921 Sophia, vol. RAN WG1, No. Busan, Korea; May 21, 2018-May 25, 2018 May 12, 2018, XP051462942, Retrieved from the Internet: URL:http://www.3gpp.org/ftp/tsg%5Fran/WG1%5FRL1/TSGR1%5F93/Docs [retrieved on May 12, 2018] section 2.1; figure 1, 6 pages.
LG Electronics: "Initial Access and Mobility for NR Unlicensed Operation", 3GPP Draft; R1-1808508, 3rd Generation Partnership Project (3GPP), Mobile Competence Centre, 650, Route Des Lucioles, F-06921 Sophia, vol. RAN WG1, No. Gothenburg, Sweden; Aug. 20, 2018-Aug. 24, 2018 Aug. 11, 2018, XP051515886, Retrieved from the Internet: URL:http://www.3gpp.org/ftp/tsg%5Fran/WG1%5FRL1/TSGR1%5F94/Docs/R1%2D1808508%2Ezip [retrieved on Aug. 11, 2018] section 2.3; figure 5, 12 pages.
Partial International Search Report—PCT/US2019/046791—ISA/EPO—dated Oct. 29, 2019.
International Search Report and Written Opinion—PCT/US2019/046791—ISA/EPO—dated Dec. 20, 2019.

* cited by examiner

SSB 605

Control Resource Set 610

RMSI PDSCH 615

SYNCHRONIZATION SIGNAL BLOCK AND REMAINING MINIMUM SYSTEM INFORMATION INTEGRATION IN UNLICENSED SYSTEMS

CROSS REFERENCE

The present Application for Patent claims the benefit of U.S. Provisional Patent Application No. 62/719,552 by SUN, et al., entitled "SYNCHRONIZATION SIGNAL BLOCK AND REMAINING MINIMUM SYSTEM INFORMATION INTEGRATION IN UNLICENSED SYSTEMS," filed Aug. 17, 2018, assigned to the assignee hereof, and expressly incorporated herein.

BACKGROUND

The following relates generally to wireless communications, and more specifically to synchronization signal block and remaining minimum system information integration in unlicensed systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station operating in a shared radio frequency spectrum band may perform listen-before-talk (LBT) before gaining control of a transmission medium. If the base station has a gap in transmission, another wireless device may perform LBT during the transmission gap and gain control of the transmission medium, even if the base station has more to transmit. This may delay transmissions from the base station.

SUMMARY

The described techniques relate to improved methods, systems, devices, and apparatuses that support synchronization signal block (SSB) and remaining minimum system information (RMSI) integration in unlicensed systems. A base station operating in a shared radio frequency spectrum band may perform a listen-before-talk (LBT) procedure to transmit an SSB. A user equipment (UE) may monitor for SSBs as part of acquiring system information, such as RMSI. The SSB may indicate a control resource set, on which the base station may transmit a grant for a downlink shared channel. The base station may transmit the system information in a downlink shared channel signal over the downlink shared channel. To reduce a chance of another wireless device gaining control of the transmission medium, the base station and the UE may implement techniques to reduce a number of transmission gaps by integrating SSB and RMSI delivery.

For example, the base station may transmit SSBs and corresponding RMSI transmissions in a same transmission opportunity (TxOP) and configure resource allocations to reduce or eliminate transmission gaps. For example, the SSBs and the corresponding RMSI transmissions may be transmitted using a single LBT. For each SSB, the associated RMSI control resource set and RMSI downlink shared channel location is nearby. In some cases, the SSB, control resource set, and downlink shared channel are continuous in time and transmitted as a package. When multiple SSBs are transmitted, the integrated SSB/RMSI transmissions may be concatenated or transmitted back to back. The base station and UE may also support varying size and lengths of the downlink shared channel resources.

In some cases, the base station may transmit a tight (e.g., back to back) SSB burst followed by an RMSI block burst. An RMSI block may include an RMSI control resource set and an RMSI downlink shared channel, which is used to transmit system information. To improve signaling efficiency, the SSB burst and the RMSI block burst may transmitted in an inverse quasi co-location (QCL) order. For example, a last-transmitted SSB of the SSB burst may correspond to a first-transmitted RMSI block of the RMSI block burst. In some cases, a physical broadcast channel (PBCH) of the SSBs may include information related to RMSI block length, an SSB index, and a number of SSBs transmitted. Thus, a UE may receive an SSB, identify a starting position for the RMSI block burst, and monitor for an RMSI corresponding to the received RMSI block based on the starting position for the RMSI block burst, an SSB index of the received SSB, and a size of the RMSI blocks. The base station and UE may also implement techniques to handle high priority signaling and reusing SSB resources for the high priority signaling.

A method of wireless communications at a UE is described. The method may include receiving, from a base station, an SSB of an SSB burst in a slot, receiving, within the SSB, an indication of a control resource set to monitor for grants for system information on a downlink shared channel, where the control resource set is after a previous SSB of the SSB burst and before the received SSB, identifying a configuration for a downlink shared channel signal carrying system information corresponding to the received SSB and the indicated control resource set, and receiving, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission including a next SSB.

An apparatus for wireless communications at a UE is described. The apparatus may include a processor, memory in electronic communication with the processor, and instructions stored in the memory. The instructions may be executable by the processor to cause the apparatus to receive, from a base station, an SSB of an SSB burst in a slot, receive, within the SSB, an indication of a control resource set to monitor for grants for system information on a downlink shared channel, where the control resource set is after a previous SSB of the SSB burst and before the received SSB, identify a configuration for a downlink shared channel signal carrying system information corresponding to the received SSB and the indicated control resource set, and receive, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission including a next SSB.

Another apparatus for wireless communications at a UE is described. The apparatus may include means for receiving, from a base station, an SSB of an SSB burst in a slot, receiving, within the SSB, an indication of a control resource set to monitor for grants for system information on a downlink shared channel, where the control resource set is after a previous SSB of the SSB burst and before the received SSB, identifying a configuration for a downlink shared channel signal carrying system information corresponding to the received SSB and the indicated control resource set, and receiving, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission including a next SSB.

A non-transitory computer-readable medium storing code for wireless communications at a UE is described. The code may include instructions executable by a processor to receive, from a base station, an SSB of an SSB burst in a slot, receive, within the SSB, an indication of a control resource set to monitor for grants for system information on a downlink shared channel, where the control resource set is after a previous SSB of the SSB burst and before the received SSB, identify a configuration for a downlink shared channel signal carrying system information corresponding to the received SSB and the indicated control resource set, and receive, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission including a next SSB.

Some examples of the method, apparatuses, and non-transitory computer-readable medium described herein may further include operations, features, means, or instructions for receiving the control resource set in a first and a second symbol period before the received SSB, where the first and second symbol period may be adjacent to the previous SSB in time.

Some examples of the method, apparatuses, and non-transitory computer-readable medium described herein may further include operations, features, means, or instructions for receiving the downlink shared channel signal starting from a first symbol period of the received SSB through a last symbol period of the slot.

In some examples of the method, apparatuses, and non-transitory computer-readable medium described herein, the downlink shared channel signal carrying system information may be frequency division multiplexed with the received SSB.

Some examples of the method, apparatuses, and non-transitory computer-readable medium described herein may further include operations, features, means, or instructions for receiving the downlink shared channel signal starting from a first symbol period after the received SSB through a last symbol period of the slot.

In some examples of the method, apparatuses, and non-transitory computer-readable medium described herein, the downlink shared channel signal carrying system information may be time division multiplexed with the received SSB.

Some examples of the method, apparatuses, and non-transitory computer-readable medium described herein may further include operations, features, means, or instructions for receiving the downlink shared channel signal starting from a first symbol period of the received SSB until a first symbol period of the next SSB.

In some examples of the method, apparatuses, and non-transitory computer-readable medium described herein, the downlink shared channel signal includes RMSI.

In some examples of the method, apparatuses, and non-transitory computer-readable medium described herein, a resource size for the downlink shared channel is configurable.

In some examples of the method, apparatuses, and non-transitory computer-readable medium described herein, the received SSB and the previous SSB may each have an even SSB index or an odd SSB index.

A method of wireless communications at a UE is described. The method may include receiving, from a base station, an SSB of an SSB burst including a set of SSBs, determining whether a set of RMSI blocks are transmitted, identifying a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted, and monitoring for the RMSI block based on the identified starting position and whether the set of RMSI blocks are transmitted.

An apparatus for wireless communications at a UE is described. The apparatus may include a processor, memory in electronic communication with the processor, and instructions stored in the memory. The instructions may be executable by the processor to cause the apparatus to receive, from a base station, an SSB of an SSB burst including a set of SSBs, determine whether a set of RMSI blocks are transmitted, identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted, and monitor for the RMSI block based on the identified starting position and whether the set of RMSI blocks are transmitted.

Another apparatus for wireless communications at a UE is described. The apparatus may include means for receiving, from a base station, an SSB of an SSB burst including a set of SSBs, determining whether a set of RMSI blocks are transmitted, identifying a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted, and monitoring for the RMSI block based on the identified starting position and whether the set of RMSI blocks are transmitted.

A non-transitory computer-readable medium storing code for wireless communications at a UE is described. The code may include instructions executable by a processor to receive, from a base station, an SSB of an SSB burst including a set of SSBs, determine whether a set of RMSI blocks are transmitted, identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted, and monitor for the RMSI block based on the identified starting position and whether the set of RMSI blocks are transmitted.

Some examples of the method, apparatuses, and non-transitory computer-readable medium described herein may further include operations, features, means, or instructions for identifying a fixed time corresponding to an end for transmission of the SSB burst and a start for transmission of the set of RMSI blocks, where the starting position for the received RMSI block may be identified based on the fixed time.

Some examples of the method, apparatuses, and non-transitory computer-readable medium described herein may further include operations, features, means, or instructions for receiving an indicator of a length of the RMSI block in the received SSB.

In some examples of the method, apparatuses, and non-transitory computer-readable medium described herein, the RMSI block includes a downlink control channel signal and a downlink shared channel signal, where a payload for the downlink shared channel signal includes system information.

In some examples of the method, apparatuses, and non-transitory computer-readable medium described herein, the received SSB may be quasi co-located with the received RMSI block.

Some examples of the method, apparatuses, and non-transitory computer-readable medium described herein may further include operations, features, means, or instructions for identifying an indicator of a time shift in the received SSB, where the time shift may be based on a LBT procedure performed by the base station and identifying the starting position for the set of RMSI blocks based on the time shift.

A method of wireless communications at a base station is described. The method may include transmitting a control resource set including a grant for a downlink shared channel carrying system information, transmitting, to a UE, an SSB of an SSB burst in a slot, where the control resource set is transmitted adjacent to a previous SSB of the SSB burst and before the transmitted SSB, and transmitting, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB.

An apparatus for wireless communications at a base station is described. The apparatus may include a processor, memory in electronic communication with the processor, and instructions stored in the memory. The instructions may be executable by the processor to cause the apparatus to transmit a control resource set including a grant for a downlink shared channel carrying system information, transmit, to a UE, an SSB of an SSB burst in a slot, where the control resource set is transmitted adjacent to a previous SSB of the SSB burst and before the transmitted SSB, and transmit, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB.

Another apparatus for wireless communications at a base station is described. The apparatus may include means for transmitting a control resource set including a grant for a downlink shared channel carrying system information, transmitting, to a UE, an SSB of an SSB burst in a slot, where the control resource set is transmitted adjacent to a previous SSB of the SSB burst and before the transmitted SSB, and transmitting, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB.

A non-transitory computer-readable medium storing code for wireless communications at a base station is described. The code may include instructions executable by a processor to transmit a control resource set including a grant for a downlink shared channel carrying system information, transmit, to a UE, an SSB of an SSB burst in a slot, where the control resource set is transmitted adjacent to a previous SSB of the SSB burst and before the transmitted SSB, and transmit, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB.

Some examples of the method, apparatuses, and non-transitory computer-readable medium described herein may further include operations, features, means, or instructions for transmitting the control resource set in a first and a second symbol period before the transmitted SSB, where the first and second symbol period may be adjacent to the previous SSB in time.

Some examples of the method, apparatuses, and non-transitory computer-readable medium described herein may further include operations, features, means, or instructions for transmitting the downlink shared channel signal starting from a first symbol period of the transmitted SSB through a last symbol period of the slot.

In some examples of the method, apparatuses, and non-transitory computer-readable medium described herein, the downlink shared channel signal carrying system information may be frequency division multiplexed with the transmitted SSB.

Some examples of the method, apparatuses, and non-transitory computer-readable medium described herein may further include operations, features, means, or instructions for transmitting the downlink shared channel signal starting from a first symbol period after the transmitted SSB through a last symbol period of the slot.

In some examples of the method, apparatuses, and non-transitory computer-readable medium described herein, the downlink shared channel signal carrying system information may be time division multiplexed with the transmitted SSB.

Some examples of the method, apparatuses, and non-transitory computer-readable medium described herein may further include operations, features, means, or instructions for transmitting the downlink shared channel starting from a first symbol period of the transmitted SSB until a first symbol period of the next SSB.

In some examples of the method, apparatuses, and non-transitory computer-readable medium described herein, the downlink shared channel signal includes RMSI.

A method of wireless communications at a base station is described. The method may include transmitting an SSB burst including a set of SSBs, determining whether to transmit a set of RMSI blocks adjacent to the SSB burst in time, where the set of RMSI blocks are inverse-respectively quasi co-located with the set of SSBs, and transmitting an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted.

An apparatus for wireless communications at a base station is described. The apparatus may include a processor, memory in electronic communication with the processor, and instructions stored in the memory. The instructions may be executable by the processor to cause the apparatus to transmit an SSB burst including a set of SSBs, determine whether to transmit a set of RMSI blocks adjacent to the SSB burst in time, where the set of RMSI blocks are inverse-respectively quasi co-located with the set of SSBs, and transmit an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted.

Another apparatus for wireless communications at a base station is described. The apparatus may include means for transmitting an SSB burst including a set of SSBs, determining whether to transmit a set of RMSI blocks adjacent to the SSB burst in time, where the set of RMSI blocks are inverse-respectively quasi co-located with the set of SSBs, and transmitting an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted.

A non-transitory computer-readable medium storing code for wireless communications at a base station is described. The code may include instructions executable by a processor to transmit an SSB burst including a set of SSBs, determine whether to transmit a set of RMSI blocks adjacent to the SSB burst in time, where the set of RMSI blocks are inverse-respectively quasi co-located with the set of SSBs, and transmit an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted.

Some examples of the method, apparatuses, and non-transitory computer-readable medium described herein may further include operations, features, means, or instructions for identifying a fixed time corresponding to an end for transmission of the SSB burst and a start for transmission of the set of RMSI blocks, where the starting position for the transmitted RMSI block may be indicated based on the fixed time.

In some examples of the method, apparatuses, and non-transitory computer-readable medium described herein, the SSB burst and the set of RMSI blocks may be adjacent in time.

Some examples of the method, apparatuses, and non-transitory computer-readable medium described herein may further include operations, features, means, or instructions for transmitting an indicator of a length of the transmitted RMSI block in the SSB corresponding to the transmitted RMSI block.

In some examples of the method, apparatuses, and non-transitory computer-readable medium described herein, the transmitted RMSI block includes a downlink control channel signal and a downlink shared channel signal, where a payload for the downlink shared channel signal includes system information.

Some examples of the method, apparatuses, and non-transitory computer-readable medium described herein may further include operations, features, means, or instructions for performing a LBT procedure, identifying a time shift for the SSB based on the LBT procedure and indicating the starting position for the transmitted RMSI block based on the time shift.

Some examples of the method, apparatuses, and non-transitory computer-readable medium described herein may further include operations, features, means, or instructions for performing a LBT procedure, identifying a time delay based on the LBT procedure and transmitting a subset of SSBs of the SSB burst based on the time delay.

A method of wireless communications at a base station is described. The method may include identifying a high priority signal, configuring a rate matching resource set to include time and frequency domain resources used for SSB transmission, transmitting a downlink grant to a UE including a bit to indicate downlink shared channel rate matching, refraining from transmitting an SSB based on the identified high priority signal, and transmitting the high priority signal from the base station on resources of the SSB.

An apparatus for wireless communications at a base station is described. The apparatus may include a processor, memory in electronic communication with the processor, and instructions stored in the memory. The instructions may be executable by the processor to cause the apparatus to identify a high priority signal, configure a rate matching resource set to include time and frequency domain resources used for SSB transmission, transmit a downlink grant to a UE including a bit to indicate downlink shared channel rate matching, refrain from transmitting an SSB based on the identified high priority signal, and transmit the high priority signal from the base station on resources of the SSB.

Another apparatus for wireless communications at a base station is described. The apparatus may include means for identifying a high priority signal, configuring a rate matching resource set to include time and frequency domain resources used for SSB transmission, transmitting a downlink grant to a UE including a bit to indicate downlink shared channel rate matching, refraining from transmitting an SSB based on the identified high priority signal, and transmitting the high priority signal from the base station on resources of the SSB.

A non-transitory computer-readable medium storing code for wireless communications at a base station is described. The code may include instructions executable by a processor to identify a high priority signal, configure a rate matching resource set to include time and frequency domain resources used for SSB transmission, transmit a downlink grant to a UE including a bit to indicate downlink shared channel rate matching, refrain from transmitting an SSB based on the identified high priority signal, and transmit the high priority signal from the base station on resources of the SSB.

Some examples of the method, apparatuses, and non-transitory computer-readable medium described herein may further include operations, features, means, or instructions for configuring a transmitted SSB bitmap to all zeroes, where the high priority signal may be transmitted based on the bitmap.

Some examples of the method, apparatuses, and non-transitory computer-readable medium described herein may further include operations, features, means, or instructions for identifying a low priority signal, indicating to the UE to disable rate matching for a next SSB, transmitting the next SSB and transmitting the low priority signal excluding resources for the next SSB.

A method of wireless communications at a UE is described. The method may include receiving a downlink grant from a base station including a bit indicating downlink shared channel rate matching, identifying a high priority signal based on the bit indicating downlink shared channel rate matching, rating matching around an SSB based on the identified high priority signal, and receiving the high priority signal from the base station on resources of the SSB based on the bitmap.

An apparatus for wireless communications at a UE is described. The apparatus may include a processor, memory in electronic communication with the processor, and instructions stored in the memory. The instructions may be executable by the processor to cause the apparatus to receive a downlink grant from a base station including a bit indicating downlink shared channel rate matching, identify a high priority signal based on the bit indicating downlink shared channel rate matching, rate matching around an SSB based on the identified high priority signal, and receive the high priority signal from the base station on resources of the SSB based on the bitmap.

Another apparatus for wireless communications at a UE is described. The apparatus may include means for receiving a downlink grant from a base station including a bit indicating downlink shared channel rate matching, identifying a high priority signal based on the bit indicating downlink shared channel rate matching, rating matching around an SSB based on the identified high priority signal, and receiving the high priority signal from the base station on resources of the SSB based on the bitmap.

A non-transitory computer-readable medium storing code for wireless communications at a UE is described. The code may include instructions executable by a processor to receive a downlink grant from a base station including a bit indicating downlink shared channel rate matching, identify a high priority signal based on the bit indicating downlink shared channel rate matching, rate matching around an SSB based on the identified high priority signal, and receive the high priority signal from the base station on resources of the SSB based on the bitmap.

Some examples of the method, apparatuses, and non-transitory computer-readable medium described herein may further include operations, features, means, or instructions for identifying a transmitted SSB bitmap to all zeroes, where the high priority signal may be received based on the bitmap.

Some examples of the method, apparatuses, and non-transitory computer-readable medium described herein may further include operations, features, means, or instructions for receiving an indication to disable rate matching for a next SSB, identifying a low priority signal based on the indication, receiving the next SSB and receiving the low priority signal excluding resources for the next SSB.

DETAILED DESCRIPTION

Figure 1:
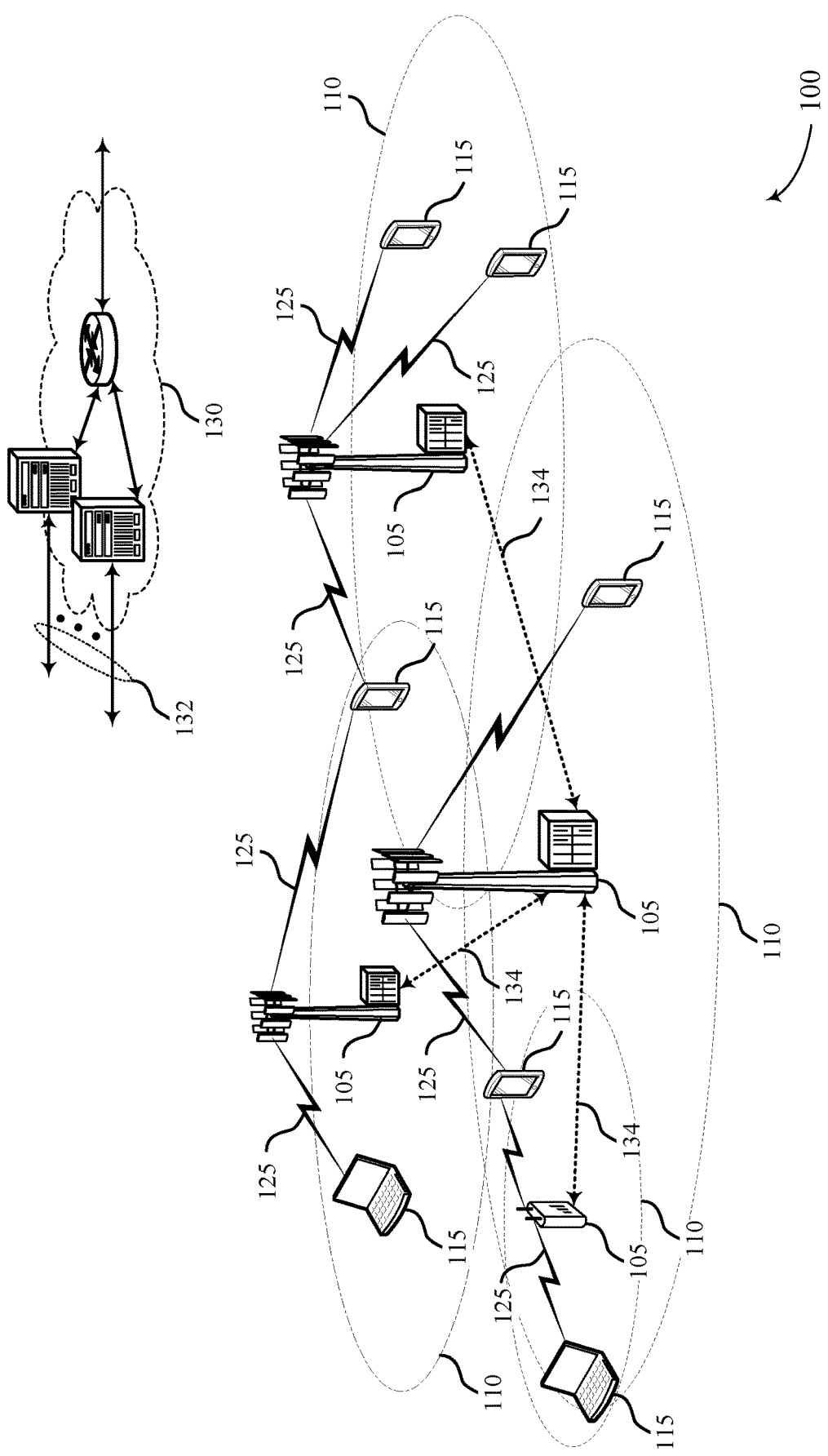
FIG. 1 illustrates an example of a system for wireless communications that supports synchronization signal block and remaining minimum system information integration in unlicensed systems in accordance with aspects of the present disclosure.

A base station operating in a shared radio frequency spectrum band may perform a listen-before-talk (LBT) procedure to transmit a synchronization signal block (SSB). A user equipment (UE) may monitor for SSBs as part of acquiring system information, such as remaining minimum system information (RMSI). The SSB may indicate a control resource set, on which the base station may transmit a grant for a downlink shared channel. The base station may transmit the system information in a downlink shared channel signal over the downlink shared channel. However, in the shared radio frequency spectrum, another wireless device may pass LBT and gain control of the transmission medium if the base station has gaps in between transmissions. Therefore, the base station and the UE may implement techniques to integrate SSB and RMSI delivery.

For example, the base station may transmit SSBs and corresponding RMSI transmissions in a same transmission opportunity (TxOP) and configure resource allocations to reduce or eliminate transmission gaps that result from conventional techniques. For example, the SSBs and the corresponding RMSI transmissions may be transmitted using a single LBT. For each SSB, the associated RMSI control resource set and RMSI downlink shared channel location is nearby, in some cases continuous in time such that the SSB, control resource set, and shared channel signal carrying RMSI are transmitted as a package. When multiple SSBs are transmitted, the integrated SSB/RMSI transmissions may be concatenated or transmitted back to back. The techniques may be implemented for different numbers of SSBs transmitted in an SSB burst. The base station and UE may also support varying size and lengths of the downlink shared channel resources. For example, the downlink shared channel resources may span from an end of the SSB to an end of a slot or span up to a full slot in time. In some cases, an increased number of resource elements in the downlink shared channel resources may assist the receiving device in decoding the downlink shared channel signal.

In some cases, the base station may transmit a tight (e.g., back to back) SSB burst followed by an RMSI block burst. An RMSI block may include an RMSI physical downlink control channel (PDCCH) (e.g., a control resource set) and an RMSI physical downlink shared channel (PDSCH) (e.g., a downlink shared channel used to signal system information). To improve signaling efficiency, the SSB burst and the RMSI block burst may transmitted in an inverse quasi co-location (QCL) order. For example, a last-transmitted SSB of the SSB burst may correspond to a first-transmitted RMSI block of the RMSI block burst. In some cases, a physical broadcast channel (PBCH) of the SSBs may include information related to RMSI block length, an SSB index, and a number of SSBs transmitted. Thus, a UE may receive an SSB, identify a starting position for the RMSI block burst, and monitor for an RMSI corresponding to the received RMSI block based on the starting position for the RMSI block burst, an SSB index of the received SSB, and a size of the RMSI blocks.

In some cases, the base station may interrupt an SSB transmission for high priority traffic. In some cases, the base station may over-provision (e.g., use more than a need number of) SSBs, which may provide flexibility to skip some of the SSBs and send urgent traffic. Provisioned SSBs may be indicated by an SSB bitmap. In a first example, RMSI may not commit any SSBs (e.g., the SSB bitmap is all zeroes). Thus, the UE may not rate match around SSB resources by default. The base station may transmit UE-specific signaling, for example transmitted in downlink control information (DCI), to dynamically configure rate matching for SSB resources and toggle indices of the SSB bitmap to one for actually transmitted SSBs. In another example, RMSI may commit all of the provisioned SSBs (e.g., SSB bitmap is all ones). In this example, the base station may transmit UE-specific signaling to indicate which SSBs are not transmitted. The UE may use the resource for provisioned SSBs which are not transmitted.

Aspects of the disclosure are initially described in the context of a wireless communications system. Aspects of the disclosure are further illustrated by and described with reference to apparatus diagrams, system diagrams, and flowcharts that relate to synchronization signal block and remaining minimum system information integration in unlicensed systems.

FIG. 1 illustrates an example of a wireless communications system 100 that supports synchronization signal block and remaining minimum system information integration in unlicensed systems in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation (CA) configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s$=1/30,720,000 seconds. Time intervals of a communications resource may be organized according to radio frames each having a duration of 10 milliseconds (ms), where the frame period may be expressed as $T_f$=307,200 $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an Evolved-UTRA (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 may transmit SSBs and corresponding RMSI transmissions in a same TxOP and configure resource allocations to reduce or eliminate transmission gaps. For example, the SSBs and the corresponding RMSI transmissions may be transmitted after passing a single LBT. For each SSB, the associated RMSI control resource set and RMSI downlink shared channel location is nearby. In some cases, the SSB, control resource set, and downlink shared channel are continuous in time and transmitted as a package. When multiple SSBs are transmitted, the integrated SSB/RMSI transmissions may be concatenated or transmitted back to back. The base station 105 and UE 115 may also support varying size and lengths of the downlink shared channel resources.

In some cases, the base station 105 may transmit a tight (e.g., back to back) SSB burst followed by an RMSI block burst. An RMSI block may include an RMSI PDCCH (e.g., a control resource set) and an RMSI PDSCH (e.g., a downlink shared channel used to signal system information). To improve signaling efficiency, the SSB burst and the RMSI block burst may transmitted in an inverse quasi co-location order. For example, a last-transmitted SSB of the SSB burst may correspond to a first-transmitted RMSI block of the RMSI block burst. In some cases, PBCH of the SSBs may include information related to RMSI block length, an SSB index, and a number of SSBs transmitted. Thus, a UE 115 may receive an SSB, identify a starting position for the RMSI block burst, and monitor for an RMSI corresponding to the received RMSI block based on the starting position for the RMSI block burst, an SSB index of the received SSB, and a size of the RMSI blocks. The base station 105 and UE 115 may also implement techniques to handle high priority signaling and reusing SSB resources for the high priority signaling.

Figure 2:
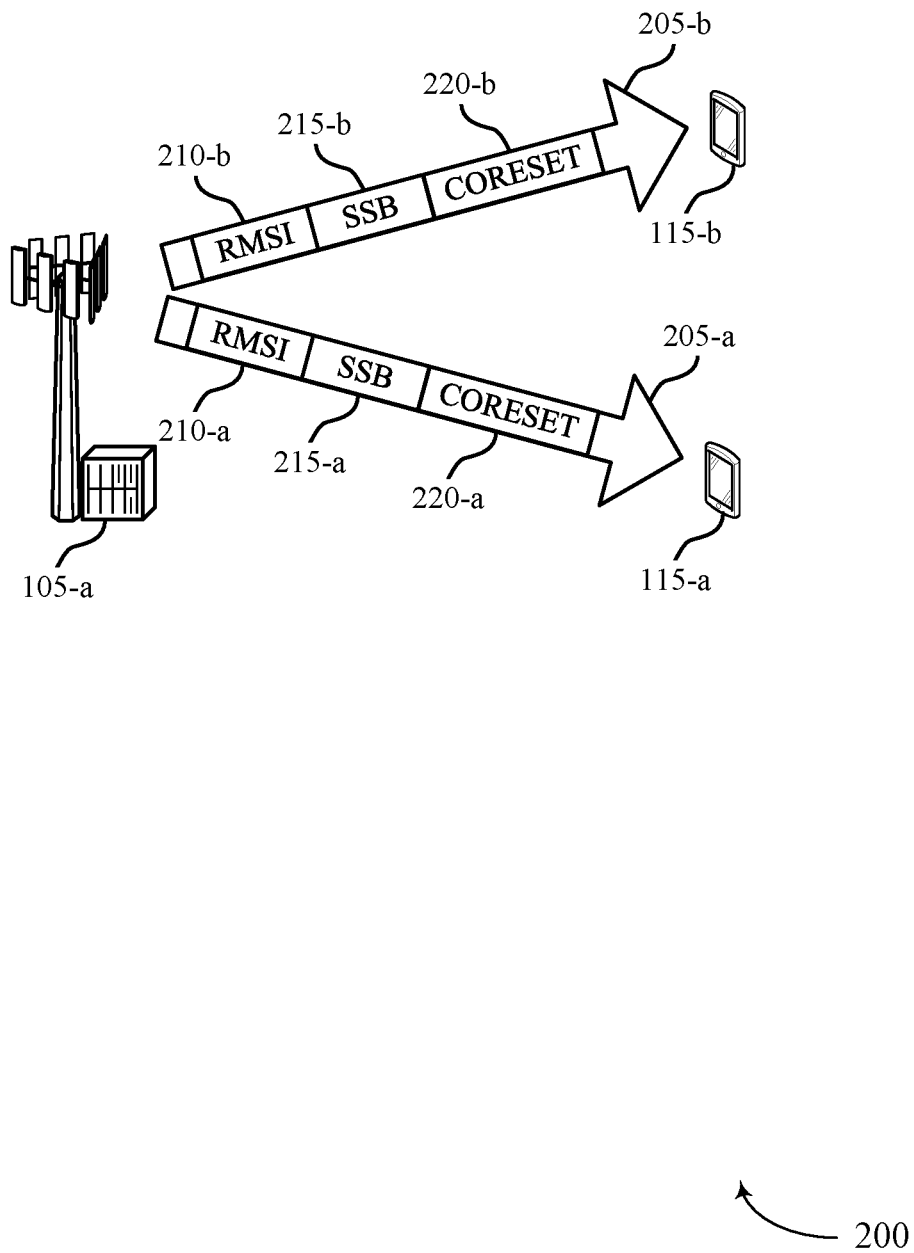
FIG. 2 illustrates an example of a wireless communications system that supports synchronization signal block and remaining minimum system information integration in unlicensed systems in accordance with aspects of the present disclosure.

FIG. 2 illustrates an example of a wireless communications system 200 that supports synchronization signal block and remaining minimum system information integration in unlicensed systems in accordance with aspects of the present disclosure. In some examples, wireless communications system 200 may implement aspects of wireless communications system 100. The wireless communications system 200 may include base station 105-a, which may be an example of a base station 105. The wireless communications system 200 may also include UE 115-a and UE 115-b, which may each be an example of a UE 115. Base station 105-a may transmit to UE 115-a with a downlink transmission 205-a and transmit to UE 115-b with a downlink transmission 205-b.

Base station 105-a may periodically transmit SSBs 215 which include some system information in a master information block (MIB). The MIB may be transmitted in a physical broadcast channel (PBCH) in the SSB 215. A UE 115 which wakes up in the cell provided by base station 105-a or a UE 115 which performs initial access to base station 105-a may use the information in the MIB to receive system information blocks (SIBs) carrying system information. System information may relate basic information for UEs 115 in the wireless communications system 200. There may be multiple different SIB messages transmitted by base station 105-a, each of which may include different system information. For example, a first SIB (e.g., SIB1) may include a physical random access channel (PRACH) configuration and scheduling information for other system information. In some cases, SIB1 may be referred to as or be an example of RMSI.

An SSB 215 may include information indicating a control resource set 220, or a CORESET. The control resource set 220 may include downlink control channel resources (e.g., physical downlink control channel (PDCCH) resources), on which base station 105-a transmit a downlink control channel signal. A payload for the downlink control channel, which may be referred to as downlink control information (DCI), may include a grant which schedules a UE 115 with downlink shared channel (e.g., PDSCH) resources. Base station 105-a may then transmit a downlink shared channel signal including an RMSI PDSCH 210 over the downlink shared channel resources. In some cases, the UE 115 may identify the control resource set 220 from the SSB 215 and either wait for another periodic transmission of the control resource set 220 or retrieve a corresponding downlink control channel message from a buffer.

The wireless communications system 200 may support beamformed transmissions, where base station 105-a may transmit in the direction of a UE 115 using a directional transmit beam, and the UE 115 may receive the transmission using a directional receive beam. Each transmit beam may have an associated beam ID, beam direction, beam symbols, and the like. In some cases, each SSB may be associated with a direction. For example, SSB 215-a may be associated with a beam pointed toward UE 115-a, and SSB 215-b may be associated with a beam pointed toward UE 115-b. Base station 105-a may transmit SSB 215-a in a beamformed transmission toward UE 115-a, SSB 215-a indicating control resource set 220-a to UE 115-a. Control resource set 220-a may include scheduling information for RMSI PDSCH 210-a. Similarly, base station 105-a may transmit SSB 215-b in a beamformed transmission toward UE 115-b, SSB 215-b indicating control resource set 220-b to UE 115-b. Control resource set 220-b may include scheduling information for RMSI PDSCH 210-b.

In some cases, the wireless communications system 200 may support unlicensed or shared wireless communications. In unlicensed wireless communications, a wireless device which is ready to transmit may first perform a listen-before-talk (LBT) procedure, or another type of clear channel assessment (CCA), to determine if the transmission medium is clear. Accordingly, base station 105-a may perform an LBT procedure before transmitting a downlink transmission 205. If base station 105-a stops transmitting, another wireless device may secure the transmission medium, even if base station 105-a still has more to transmit. If base station 105-a loses the transmission medium while transmitting SSBs 215 and RMSI PDSCH 210, receipt of the RMSI may be delayed at the UEs 115. This may delay receipt of other system information at the UEs 115 (e.g., SIB2 through SIB9), which may increase delay providing services to the UEs 115.

Therefore, a base station 105 and UEs 115 described herein may implement techniques to integrate RMSI and SSB delivery in unlicensed spectrum. For example, base station 105-a may transmit SSBs 215 and corresponding RMSI PDSCH 210 in a same transmission opportunity (TxOP) and configure resource allocations to reduce or eliminate transmission gaps that result from conventional techniques. For example, the SSBs 215 and the corresponding RMSI PDSCH 210 may be transmitted using a single LBT. For each SSB 215, the associated RMSI PDCCH (e.g., control resource set 220) and RMSI PDSCH 210 location is nearby (e.g., continuous in time) such that the SSB 215, control resource set 220, and the RMSI PDSCH 210 are transmitted as a package. When multiple SSBs 215 are transmitted, the integrated SSB/RMSI blocks may be concatenated. The techniques may be implemented for different numbers of SSBs transmitted in an SSB burst.

Base station 105-a may support a standalone (SA) or a non-standalone (NSA) system. In some NSA systems, base station 105-a may not transmit RMSI but may still transmit SSBs. Therefore, some resource allocation schemes used for transmitting an SSB then an RMSI block (e.g., including an RMSI PDCCH such as a control resource set 220 and RMSI PDSCH 210), then another SSB and RMSI block may leave some transmission gaps if the RMSI blocks are not actually transmitted. To avoid transmission gaps for NSA systems, base station 105-a may transmit a tight (e.g., back to back) SSB burst followed by an RMSI block burst. For example, the base station 105 may transmit eight SSBs in an SSB burst in 32 symbol periods, if the SSBs are 4 symbol periods long. If base station 105-a transmits a sequence of SSBs followed by a sequence of RMSI, then the PBCH of an SSB 215 may indicate the starting position of the corresponding RMSI PDCCH. In some cases, the starting position of the corresponding RMSI PDCCH may depend on the number of SSBs in the SSB burst.

To improve signaling efficiency, the SSB burst and the RMSI block burst may transmitted in an inverse quasi co-location order. For example, a last-transmitted SSB of the SSB burst may correspond to a first-transmitted RMSI block of the RMSI block burst. There may be a fixed time of when the SSB burst ends and the RMSI block burst starts. Thus, each PBCH may not provide explicit RMSI start information. Instead, a PBCH may include information related to RMSI block length, an SSB index, and a number of SSBs transmitted. This technique is described in more detail in FIGS. 7 through 9.

In some cases, base station 105-a may interrupt an SSB transmission for high priority traffic. For example, there may be very high priority traffic that needs to be transmitted as soon as possible, but base station 105-a may have an SSB/RMSI package to transmit. In some cases, the RMSI transmission may not be critical or deemed as important as the high priority transmission.

In some cases, base station 105-a may over-provision (e.g., use more than a need number of) SSBs. Over-provisioning SSBs may provide flexibility to skip some of the SSBs and send urgent traffic. In an example, base station 105-a may provision 8 SSB transmissions, but base station 105-a only needs to transmit 4 SSBs. Therefore, base station 105-a may have some flexibility in which of the 8 provisioned SSB resources it actually transmits an SSB. However, UEs 115 may attempt to rate match around the provisioned SSB resources, even if base station 105-a is not actually transmitting an SSB on those resources. For example, base station 105-a may not transmit at all on a provisioned SSB resource, but the UE 115 may still attempt to rate match around the provisioned SSB resource. Techniques are described herein to improve rate matching when over-provisioning SSBs.

In a first example, RMSI may not commit any SSBs. For example, base station 105-a may transmit an SSB bitmap with all 0s to the UE 115. Thus, the UE 115 may not rate match around SSB resources by default. Base station 105-a may not configure the UE 115 to rate match around SSB patterns, by an all-zero SSB bitmap in RMSI. Base station 105-a may use up to two bits in DCI to indicate whether the UE 115 rate matches around SSB resources or not. Then, base station 105-a may dynamically configure a rate matching resource set if the base station 105 does transmit an SSB on an SSB resource. For example, base station 105 may use UE-specific signaling (e.g., RRC signaling) to define the SSB resources and indicate the UE 115 is to rate match around the SSB resources. In a second example, the RMSI bitmap may still commit the provisioned SSBs. Base station 105-a may overwrite the RMSI bitmap with UE-specific signaling. Base station 105-a may use a UE-specific DCI bit to dynamically rate match around the SSBs if transmitted. The UE 115 may use the resource if the corresponding SSB is not transmitted. In either example, if there is no urgent traffic, base station 105-a may transmit a used number of SSBs and remaining redundant SSB resources may be reused for other traffic.

Figure 3:
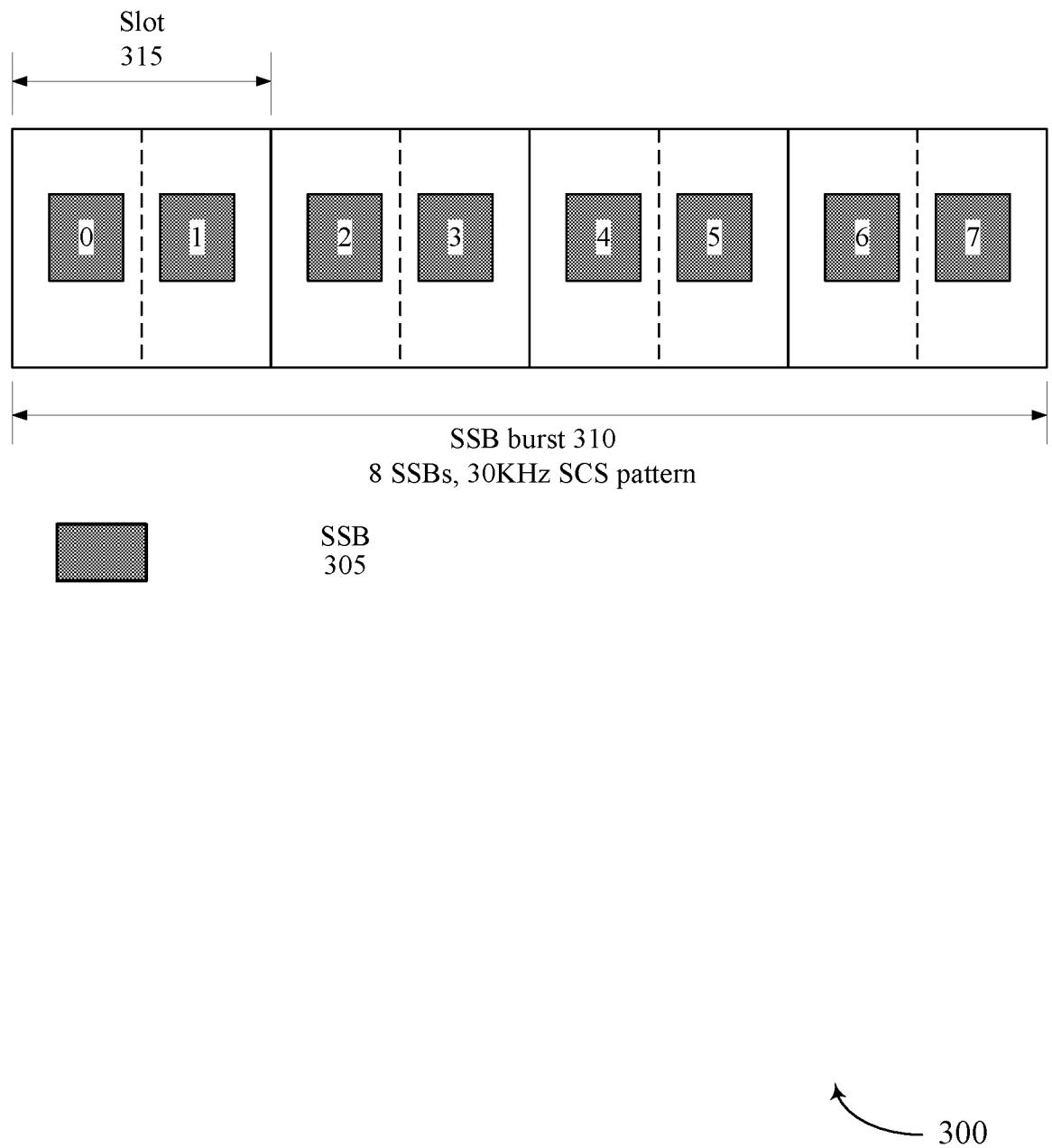
FIG. 3 illustrates an example of a synchronization signal block (SSB) burst configuration that supports synchronization signal block and remaining minimum system information integration in unlicensed systems in accordance with aspects of the present disclosure.

FIG. 3 illustrates an example of an SSB burst configuration 300 that supports synchronization signal block and remaining minimum system information integration in unlicensed systems in accordance with aspects of the present disclosure. In some examples, the SSB burst configuration 300 may implement aspects of wireless communications system 100.

A base station 105 may transmit SSBs 305 in an SSB burst 310. For example, eight SSBs 305 are transmitted across four slots 315, where two SSBs 305 are transmitted in each slot 315. In some cases, the SSB burst may have a 30 kHz subcarrier spacing (SCS) pattern. In some examples, a slot 315 may be separated into multiple portions. For example, the slot may include two half-slots, or multiple mini-slots. For example, each half-slot may be used to transmit one SSB 305. In an example, a first SSB 305 of a slot 315 may be transmitted in symbol period 3-6, where a second SSB 305 of the slot 315 may be transmitted in symbol periods 8-11.

The base station 105 may transmit an indicator of PDCCH resources in a PBCH of an SSB 305. The indicator may indicate where to find control channel resources which are used to schedule an RMSI PDSCH. In some cases, "RMSI-PDCCH-Config" may be an example of the indicator.

The indicator may include eight bits, where four bits are used to indicate a number of resource blocks, a number of symbols, and a location of the control resource set with respect to the SSB 305. The other four bits may be used to indicate an RMSI PDCCH search space. For example, the other four bits may indicate a symbol at which the control resource set starts for RMSI PDCCH monitoring. For example, the indicator may indicate both a location and size of a control resource set as well as indicate specific resources within the control resource set carrying PDCCH for scheduling a PDSCH message which carries RMSI.

In licensed wireless communications systems, RMSI PDCCH and RMSI PDSCH may be transmitted with a transmission gap to the SSB 305, as the base station 105 is not at risk of losing access to the transmission medium. However, a base station 105 and a UE 115 operating in an unlicensed radio frequency spectrum band may implement techniques to reduce a number of transmission gaps by transmitting the RMSI PDCCH, RMSI PDSCH, and SSB 305 in a packaged, or continuous, transmission. In some cases, techniques described herein may be used in licensed communications, for example in the sub-6 GHz frequency range, where integrating SSB and RMSI may enable sharing an analog beam for SSB and RMSI, which may provide more efficient delivery.

Figure 4:
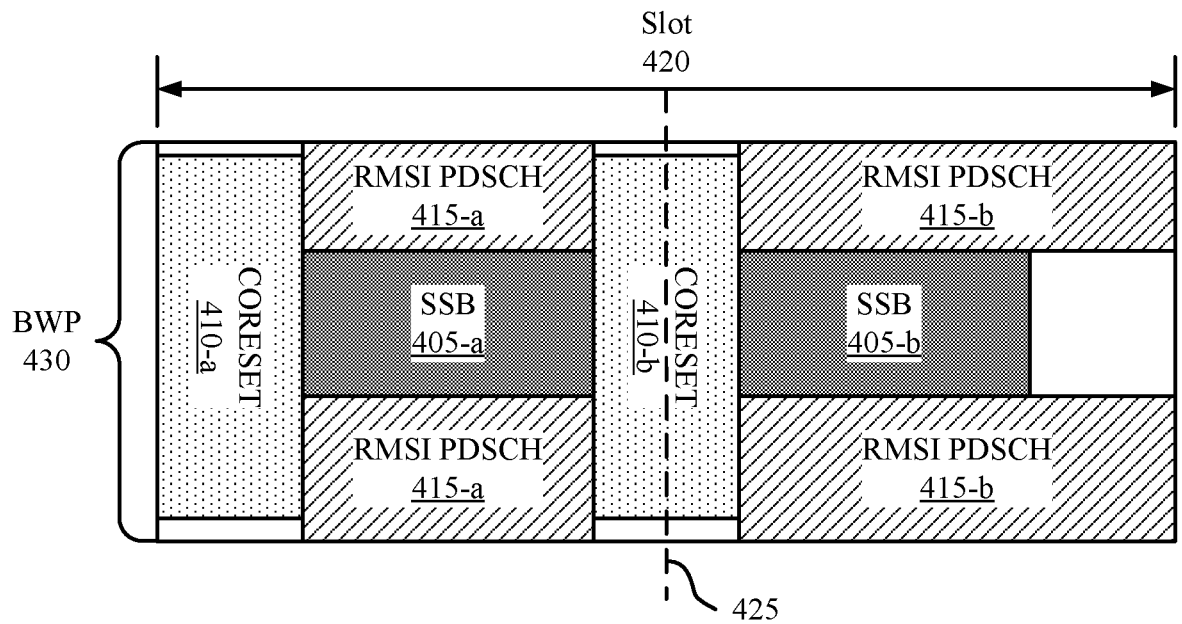
FIG. 4 illustrates an example of a remaining minimum system information (RMSI) resource allocation scheme that supports synchronization signal block and remaining minimum system information integration in unlicensed systems in accordance with aspects of the present disclosure.

FIG. 4 illustrates an example of an RMSI resource allocation scheme 400 that supports synchronization signal block and remaining minimum system information integration in unlicensed systems in accordance with aspects of the present disclosure. In some examples, the RMSI resource allocation scheme 400 may implement aspects of wireless communications system 100.

As described herein, a base station 105 may transmit an SSB 405 to a UE 115. The SSB 405 may include an indicator for a control resource set 410. The indicator may be transmitted in the PBCH of the SSB 405. The UE 115 may receive the SSB 405 and identify a location for the control resource set 410. The base station 105 may have transmitted a grant over the control resource set 410 scheduling a PDSCH resource (e.g., an RMSI PDSCH 415 or an RMSI PDSCH 415). The UE 115 may then monitor the PDSCH resource to receive a signal from the base station 105 conveying the RMSI. In this example, SSB 405-a may be an example of an even SSB, and SSB 405-b may be an example of an odd SSB. Even SSBs may be transmitted in a first half of a slot 420, where odd SSBs are transmitted in a latter half of the slot 420.

The base station 105 may transmit the SSB 405, control resource set 410, and RMSI PDSCH 415 in a bandwidth part (BWP) 430. In some cases, the BWP 430 may span 20 MHz in the frequency domain. The wireless communications system may also use 30 kHz SCS. This may provide 50 RBs in the frequency domain. The SSB 405 may use 20 RBs. Therefore, there may still be 30 RBs available within the BWP 430 (e.g., for SSB 405-a).

The base station 105 may allocate resources for an SSB 405, a control resource set 410, and an RMSI PDSCH 415 to reduce a number of transmission gaps or to support larger RMSI payloads. In some cases, more coded bits for PDSCH (e.g., larger RMSI PDSCH resources) may improve delivery reliability for RMSI. Techniques described herein may use frequency division multiplexing (FDM) or time division multiplexing (TDM), or both, of RMSI PDCCH (e.g., a control resource set 410) and RMSI PDSCH 415 with an SSB 405.

In some cases, the base station 105 and the UE 115 may support additional tables, or additional entries to tables, for PDCCH indicator values (e.g., "RMSI-PDCCH-Config" values) and start and length indicator values (SLIVs). For example, the additional tables or additional table entries may correspond to the resource allocation techniques described herein to reduce transmission gaps between an SSB 405 and a corresponding control resource set 410 and RMSI PDSCH 415.

In an example, SSB 405-a may include a PDCCH indicator which indicates a location of control resource set 410-a. Control resource set 410-a may carry scheduling information (e.g., a grant) for RMSI PDSCH 415-a. RMSI PDSCH 415-a may be FDM with SSB 405-a as shown.

In a symbol period after SSB 405-a ends, the base station may transmit control resource set 410-b. For example, SSB 405-a may end after symbol period 5 of the slot, so the base station 105 may transmit control resource set 410-b in the sixth and seventh symbol periods. Therefore, control resource set 410-b may span a first half of the slot 420 and a second half of the slot 420. In some other wireless communications systems, such as those employing licensed communications, the control resource set for the second SSB (e.g., corresponding to SSB 405-b) may be far away from SSB 405-b. By scheduling control resource set 410-b between SSB 405-a and SSB 405-b, there may be a reduced number of transmission gaps. Therefore, the base station 105 may transmit control resource set 410-a, SSB 405-a, RMSI PDSCH 415-a, control resource set 410-b, SSB 405-b, and RMSI PDSCH 415-b as a continuous time domain transmission.

RMSI PDSCH 415-b may also be scheduled until the end of the slot 420. For example, the base station 105 may schedule RMSI PDSCH 415-b for six symbols (e.g., from symbol 8 through symbol 13 of the slot 420). The increased number of resource elements in RMSI PDSCH 415-b may assist the receiving device (e.g., the UE 115) in decoding, as the UE 115 may have better coding gain. Also, extending the transmission may avoid a transmission gap at the end of the slot 420. For example, the base station 105 may have other SSBs 405 to transmit, so the base station 105 may maintain control of the transmission medium by transmitting for the full slot 420.

The base station 105 may include a configuration definition for the configuration of SSB 405-b, control resource set 410-b, and RMSI PDSCH 415-b. An indicator for the configuration may be included in the PBCH of SSB 405-b. The UE 115 may look the configuration up in a table by using the indicator. Then, the UE 115 may identify the resource allocation configuration. The UE 115 may identify the location of control resource set 410-b based on the configuration.

In some cases, smaller PDSCH resources may provide support for more SSB transmissions. For example, RMSI PDSCH 415-a may span four symbol periods (opposed to the six of RMSI PDSCH 415-b) to support transmission of the second SSB (e.g., SSB 405-b).

Figure 5:
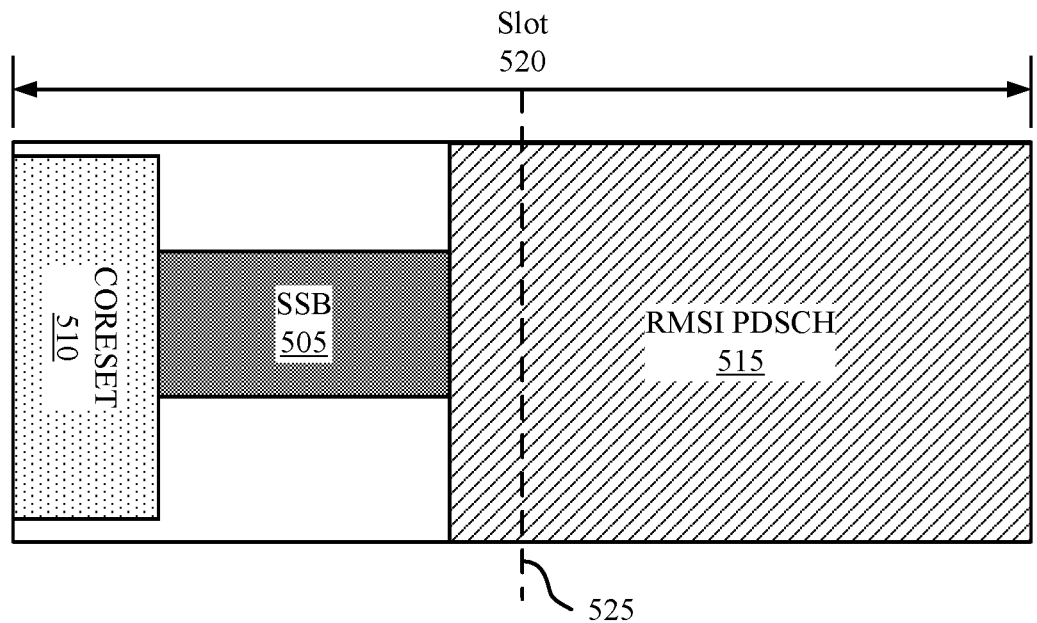
FIG. 5 illustrates an example of an RMSI resource allocation scheme that supports synchronization signal block and remaining minimum system information integration in unlicensed systems in accordance with aspects of the present disclosure.

FIG. 5 illustrates an example of an RMSI resource allocation scheme 500 that supports synchronization signal block and remaining minimum system information integration in unlicensed systems in accordance with aspects of the present disclosure. In some examples, the RMSI resource allocation scheme 500 may implement aspects of wireless communications system 100.

As described herein, a base station 105 may transmit an SSB 505 to a UE 115. The SSB 505 may include an indicator for a control resource set 510. The indicator may be transmitted in the PBCH of the SSB 505. The UE 115 may receive the SSB 505 and identify a location for the control resource set 510. The base station 105 may have transmitted a grant over the control resource set 510 scheduling an RMSI PDSCH resource (e.g., an RMSI PDSCH 515). The UE 115 may then monitor the PDSCH resource to receive a downlink shared channel signal from the base station 105 including the RMSI.

The base station 105 may allocate resources for the SSB 505, the control resource set 510, and the RMSI PDSCH 515 to reduce a number of transmission gaps or to support larger RMSI payloads. In some cases, more coded bits for PDSCH (e.g., larger RMSI PDSCH resources) may improve delivery reliability for RMSI.

As described in FIG. 3, a larger RMSI size may improve decoding performance at the receiver. For example, RMSI PDSCH 515 may be scheduled from a symbol period right after the SSB 505 until the end of the slot 520. For example, the base station 105 may schedule the RMSI PDSCH 515 for eight symbols (e.g., from symbol 6 through symbol 13 of the slot 520). The increased number of resource elements in the RMSI PDSCH 515 may assist the receiving device (e.g., the UE 115) in decoding, as the UE 115 may have better coding gain. Also, extending the transmission may avoid a transmission gap at the end of the slot 520. In this example, the base station 105 may transmit even SSBs and refrain from transmitting odd SSBs.

The base station 105 may include a configuration definition for the configuration of SSB 505, the control resource set 510, and the RMSI PDSCH 515. An indicator for the configuration may be included in the PBCH of the SSB 505. The UE 115 may look the configuration up in a table by using the indicator. Then, the UE 115 may identify the resource allocation configuration. The UE 115 may identify the location of the control resource set 510 based on the configuration. The control resource set 510 may include scheduling information (e.g., a grant) for the RMSI PDSCH 515.

Figure 6:
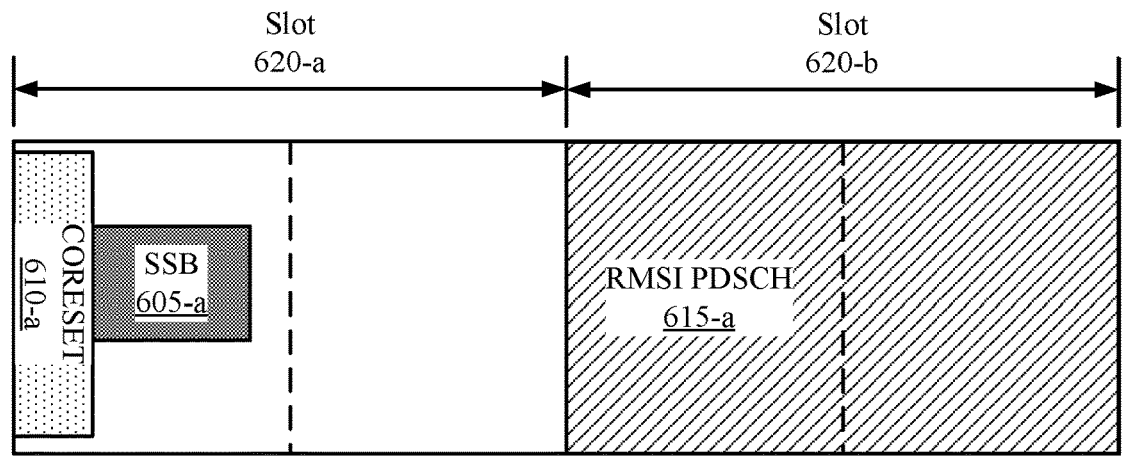
FIG. 6 illustrates an example of an RMSI resource allocation scheme that supports synchronization signal block and remaining minimum system information integration in unlicensed systems in accordance with aspects of the present disclosure.
Figure 6:
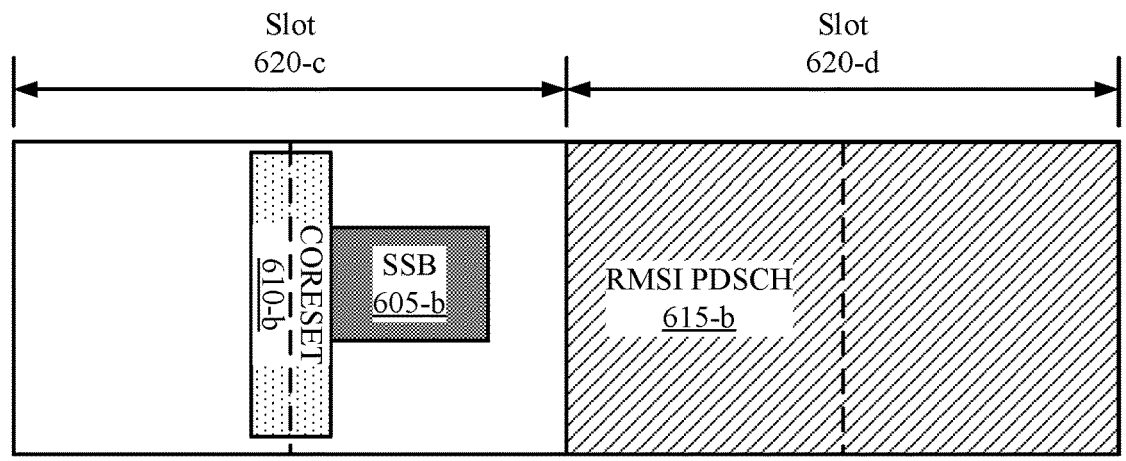
Figure 6:
Figure 6:
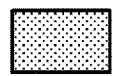
Figure 6:

FIG. 6 illustrates an example of an RMSI resource allocation scheme 600 that supports synchronization signal block and remaining minimum system information integration in unlicensed systems in accordance with aspects of the present disclosure. In some examples, the RMSI resource allocation scheme 600 may implement aspects of wireless communications system 100.

As described herein, a base station 105 may transmit an SSB 605 to a UE 115. The SSB 605 may include an indicator for a control resource set 510. The indicator may be transmitted in the PBCH of the SSB 605. The UE 115 may monitor for and receive the SSB 605 and identify a location for the control resource set 610. The base station 105 may have transmitted a grant over the control resource set 610 scheduling an RMSI PDSCH resource (e.g., an RMSI PDSCH 615). The UE 115 may then monitor the RMSI PDSCH 615 to receive a downlink shared channel signal from the base station 105 including the RMSI.

The base station 105 may allocate resources for the SSB 605, the control resource set 610, and the RMSI PDSCH 615 to reduce a number of transmission gaps or to support larger RMSI payloads. In some cases, more coded bits for PDSCH (e.g., larger RMSI PDSCH resources) may improve delivery reliability for RMSI. For example, the RMSI PDSCH 615 may include 8400 resource elements for a 20 MHz BWP with 30 kHz SCS (e.g., 50 RBs×14 symbol periods×12 tones=8400 resource elements).

For example, RMSI PDSCH 615-*a* may be scheduled for all of slot 620-*b*. The base station 105 may transmit some sort of a channel occupying signal after the SSB 605-*a* until the end of slot 620-*a*, then transmit a downlink shared channel signal on RMSI PDSCH 615-*a* for all of slot 620-*b*. In some cases, the base station 105 may transmit other information (e.g., control or data information) between SSB 605-*a* and RMSI PDSCH 615-*a*. Thus, control resource set 610-*a*, SSB 605-*a*, and RMSI PDSCH 615-*a* may all be included in a continuous transmission in time. The increased number of resource elements in RMSI PDSCH 615-*a* may assist the receiving device (e.g., the UE 115) in decoding, as the UE 115 may have better coding gain. In this example, the base station 105 may transmit every fourth SSB 605. This example may correspond to transmitting every other even SSB 605 and refrain from transmitting odd SSBs.

In another illustrated example, RMSI PDSCH 615-*b* may be scheduled for all of slot 620-*d*. The base station 105 may transmit some sort of a channel occupying signal or beacon after the SSB 605-*b* until the end of slot 620-*c*, then transmit a downlink shared channel signal on RMSI PDSCH 615-*b* for all of slot 620-*d*. In some cases, the base station 105 may transmit other information (e.g., control or data information) between SSB 605-*b* and RMSI PDSCH 615-*b*. Thus, control resource set 610-*b*, SSB 605-*b*, and RMSI PDSCH 615-*b* may all be included in a continuous transmission in time. The increased number of resource elements in RMSI PDSCH 615-*b* may assist the receiving device (e.g., the UE 115) in decoding, as the UE 115 may have better coding gain. In this example, the base station 105 may transmit every fourth SSB 605. This example may correspond to transmitting every other odd SSB 605 and refrain from transmitting even SSBs.

In other examples, the RMSI PDSCH 615 starting in a subsequent slot 620 may not use all of the symbol periods or RBs of the subsequent slot 620. For example, the RMSI PDSCH 615 may be assigned to fewer symbol periods or RBs (e.g., in the frequency domain) than the examples illustrated and described. The base station 105 may determine the allocation scheme and indicate the allocation scheme in a grant transmitted in a control resource set 610.

The base station 105 may include a configuration definition for the configuration of SSBs 605, the control resource sets 610, and the RMSI PDSCHs 615. An indicator for the configuration may be included in the PBCH of the SSBs 605. The UE 115 may look the configuration up in a table by using the indicator. Then, the UE 115 may identify the resource allocation configuration. The UE 115 may identify the location of the corresponding control resource set 610 based on the configuration. The control resource set 610 may include scheduling information (e.g., a grant) for the corresponding RMSI PDSCH 615. In some cases, the new configuration may have a K0 value greater than zero.

Figure 7:
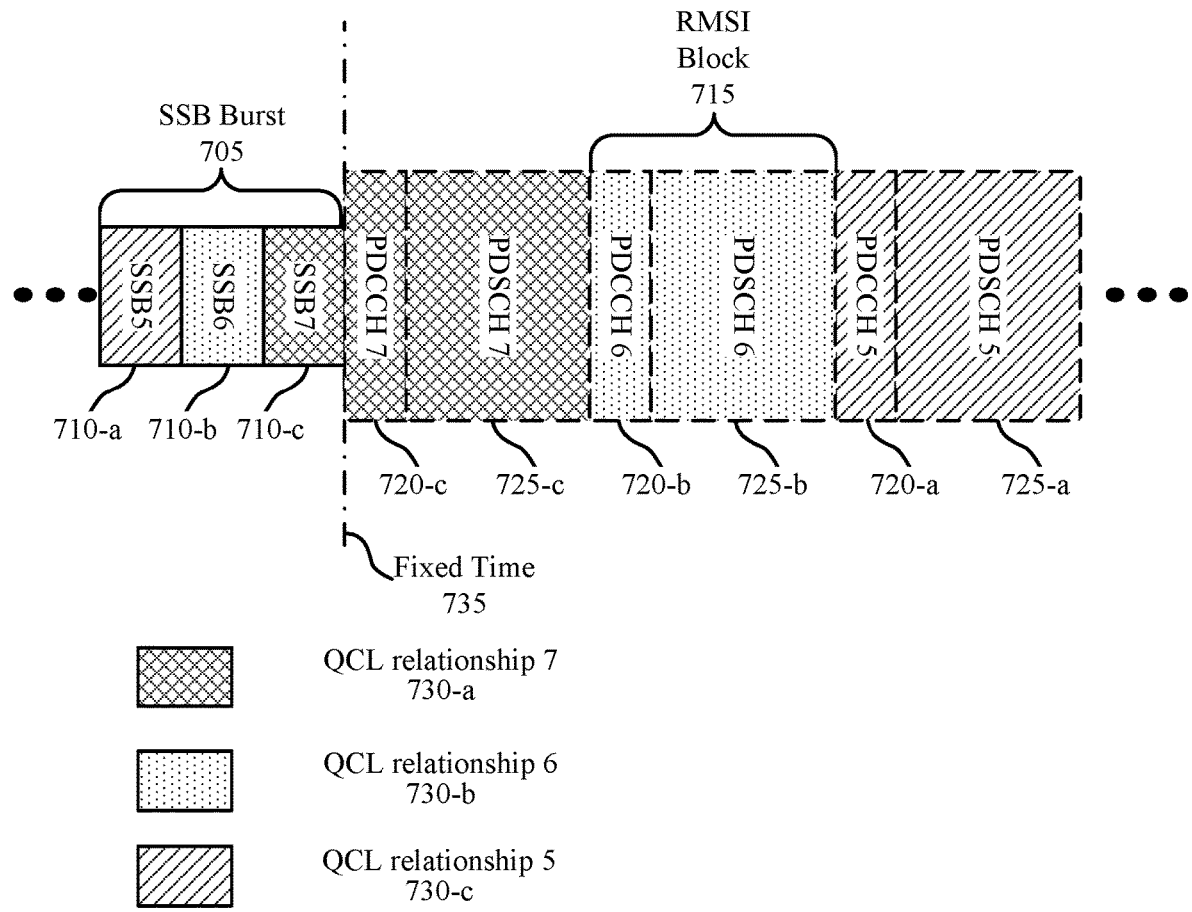
FIG. 7 illustrates an example of an RMSI block burst configuration that supports synchronization signal block and remaining minimum system information integration in unlicensed systems in accordance with aspects of the present disclosure.

FIG. 7 illustrates an example of an RMSI block burst configuration 700 that supports synchronization signal block and remaining minimum system information integration in unlicensed systems in accordance with aspects of the present disclosure. In some examples, the RMSI block burst configuration 700 may implement aspects of wireless communications system 100.

A base station 105 may support an SA configuration or an NSA configuration, or both. In NSA, the base station 105 may not transmit RMSI but may still transmit SSBs 710. Therefore, some resource allocation schemes used for transmitting an SSB 710 then an RMSI block 715 (e.g., including an RMSI PDCCH 720 and RMSI PDSCH 725), then another SSB 710 and another RMSI block 715 may leave some transmission gaps if the RMSI blocks 715 are not actually transmitted.

To avoid transmission gaps and large overhead in PBCH, the base station 105 may transmit a tight (e.g., back to back) SSB burst (such as an SSB burst 705). In SA configurations, the SSB burst may be followed by an RMSI block burst. In an example, the base station 105 may transmit up to eight SSBs 710 in an SSB burst 705. Eight SSBs 710 may be transmitted in 32 symbol periods if the SSBs 710 are 4 symbol periods long each. If the base station 105 transmits a sequence of SSBs followed by a sequence of RMSI, then the PBCH of an SSB 710 may indicate the starting position of the corresponding RMSI PDCCH. In some cases, the starting position of the corresponding RMSI PDCCH may be based on the number of SSBs 710 in the SSB burst 705.

In some cases, the SSB burst 705 and the RMSI block burst may transmitted in an inverse quasi co-location order. For example, a last-transmitted SSB of the SSB burst may correspond to a first-transmitted RMSI block of the RMSI block burst. For example, SSB 7 (e.g., SSB 710-*c*) and PDCCH 7 (e.g., RMSI PDCCH 720-*c*) may be quasi co-located (e.g., have QCL relationship 730-*a*). Similarly, a second-to-last transmitted SSB of the SSB burst corresponds to a second-transmitted RMSI block of the RMSI block burst. Thus, SSB 710-*b*, RMSI PDCCH 720-*b*, and RMSI PDSCH 725-*b* have QCL relationship 730-*b*. SSB 710-*a*, RMSI PDCCH 720-*a*, and RMSI PDSCH 725-*a* may have QCL relationship 730-*c*.

There may be a fixed time 735, which is when the SSB burst ends and the RMSI block burst begins. Thus, each PBCH may not provide explicit RMSI start information. Instead, a PBCH may include information related to RMSI block length, an SSB index, and a number of SSBs transmitted in the SSB burst 705.

In an example corresponding to an SA configuration, the base station may transmit SSB 710-*b* to a UE 115. SSB 710-*b* may have a QCL relationship 730-*b* with an RMSI block containing RMSI PDCCH 720-*b* and RMSI PDSCH 725-*c*. The PBCH in SSB 710-*b* may indicate that SSB 710-*b* is the second to last (e.g., seventh of eight) SSB 710 in the SSB burst 705. In some cases, the SSB index may be implicitly indicated by the UE 115 (e.g., may not be indicated by bits in the PBCH). The PBCH may also indicate the length of an RMSI block 715. For example, each RMSI block 715 may span 6 symbol periods, with 2 symbol periods for an RMSI PDCCH 720 and 4 symbol periods for an RMSI PDSCH 725. Other examples of RMSI block lengths may be used may be a slot, four symbols, etc., which may be examples of configurations described in FIGS. 4 through 6.

The UE 115 may identify a location for the RMSI block containing RMSI PDCCH 720-*c* and RMSI PDSCH 725-*c* based on the information in the PBCH. For example, the UE 115 may determine the corresponding RMSI block is after SSB 710-*c* and after an RMSI block containing RMSI PDCCH 720-*c* and RMSI PDSCH 725-*c*. The UE 115 may begin monitoring for RMSI PDCCH 720-*b* when RMSI PDSCH 725-*c* ends.

The UE 115 may determine various parameters for receiving the RMSI PDCCH 720-*b* based on QCL relationship 730-a. For example, the UE 115 may identify and apply Doppler parameters, delay parameters, and spatial parameters based on QCL relationship 730-a and those parameters used to transmit SSB 710-b.

The described techniques may also support NSA configurations. For example, the base station 105 may transmit the SSB burst 705 in the same order (e.g., corresponding to an inverse-ordered QCL association), but the base station 105 would not transmit the RMSI block burst for the NSA configuration.

Figure 8:
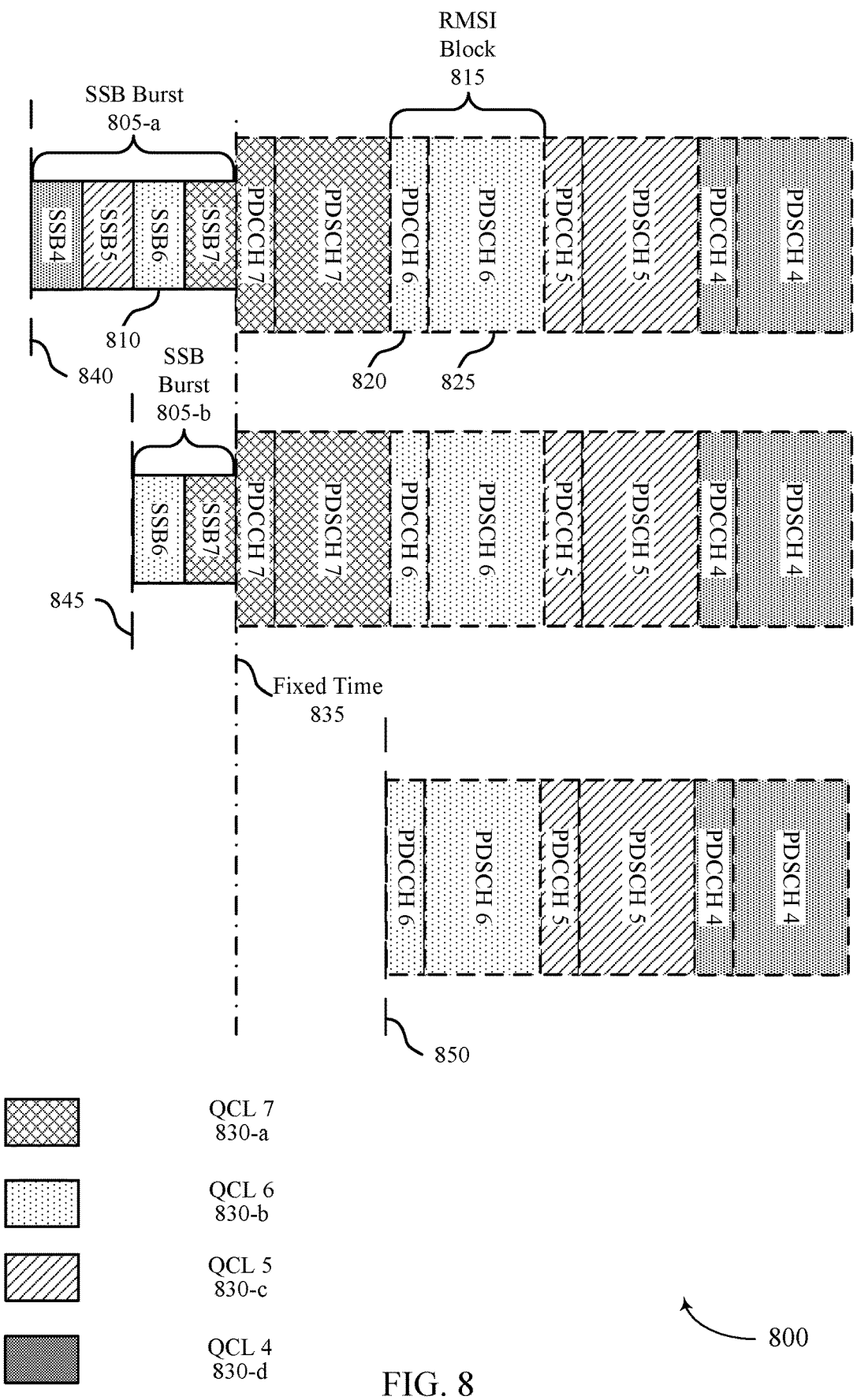
FIG. 8 illustrates an example of an RMSI block burst configuration that supports synchronization signal block and remaining minimum system information integration in unlicensed systems in accordance with aspects of the present disclosure.

FIG. 8 illustrates an example of an RMSI block burst configuration 800 that supports synchronization signal block and remaining minimum system information integration in unlicensed systems in accordance with aspects of the present disclosure. In some examples, the RMSI block burst configuration 800 may implement aspects of wireless communications system 100.

A base station 105 may support an SA configuration or an NSA configuration, or both. In NSA, the base station 105 may not transmit RMSI but may still transmit SSBs 810. To avoid transmission gaps and large overhead in PBCH, the base station 105 may transmit a tight (e.g., back to back) SSB burst (such as an SSB burst 805). In SA configurations, the SSB burst may be followed by an RMSI block burst. An RMSI block of the RMSI block burst may include an RMSI PDCCH 820 and an RMSI PDSCH 825.

In some cases, the SSB burst 805 and the RMSI block burst may transmitted in an inverse quasi co-location order. For example, a last-transmitted SSB of the SSB burst may correspond to a first-transmitted RMSI block of the RMSI block burst. For example, a last-transmitted SSB of SSB burst 805-a may be quasi co-located to a first-transmitted RMSI block of the RMSI block burst. Similarly, a second-to-last transmitted SSB of the SSB burst corresponds to a second-transmitted RMSI block 815 of the RMSI block burst. An SSB 810 of the SSB burst 805 may be quasi co-located (e.g., have a QCL relationship 830) with a corresponding RMSI block 815 of the RMSI block burst.

There may be a fixed time 835, which is when the SSB burst 805 ends and the RMSI block burst begins. Thus, each PBCH may not provide explicit RMSI start information. Instead, a PBCH may include information related to RMSI block length, an SSB index, and a number of SSBs transmitted in the SSB burst 805.

The base station 105 may perform an LBT procedure before gaining control of the transmission medium and beginning transmission. The LBT procedure may pass at different times or after a varying number of attempts based on how busy the transmission medium is. Therefore, the base station 105 may begin transmission at different points. In some cases, the base station 105 may truncate transmission of the SSB burst 805 or both the SSB burst 805 and the RMSI block burst based on when the base station 105 passes LBT. The non-truncated SSBs and RMSI blocks may still be transmitted at a fixed location.

In a first example, the base station 105 may pass the LBT at 840. Then, the base station 105 may transmit the full SSB burst 805-a and all RMSI blocks of the RMSI block burst. In a second example, the base station 105 may pass the LBT at 845. The base station 105 may truncate a first two SSBs of SSB burst 805-b, but the base station 105 may still transmit the last two SSBs and the full RMSI block burst. In another examples, the base station 105 may pass the LBT at 850. In this example, the base station 105 truncates the entire SSB burst 805 and a first RMSI block of the RMSI block burst.

The base station 105 may still transmit the remaining RMSI blocks in the RMSI block burst. A UE 115 may still monitor for of the RMSI blocks based on receiving information from a previous transmission of the SSB burst 805 or RMSI block burst. For example, the UE 115 may be in initial access have already detected an SSB 810 of the SSB burst 805.

The described techniques may also support NSA configurations. For example, the base station 105 may transmit the SSB burst 805 in the same order if the base station 105 passes LBT in time. However, the base station 105 may not transmit the RMSI block burst for the NSA configuration.

Figure 9:
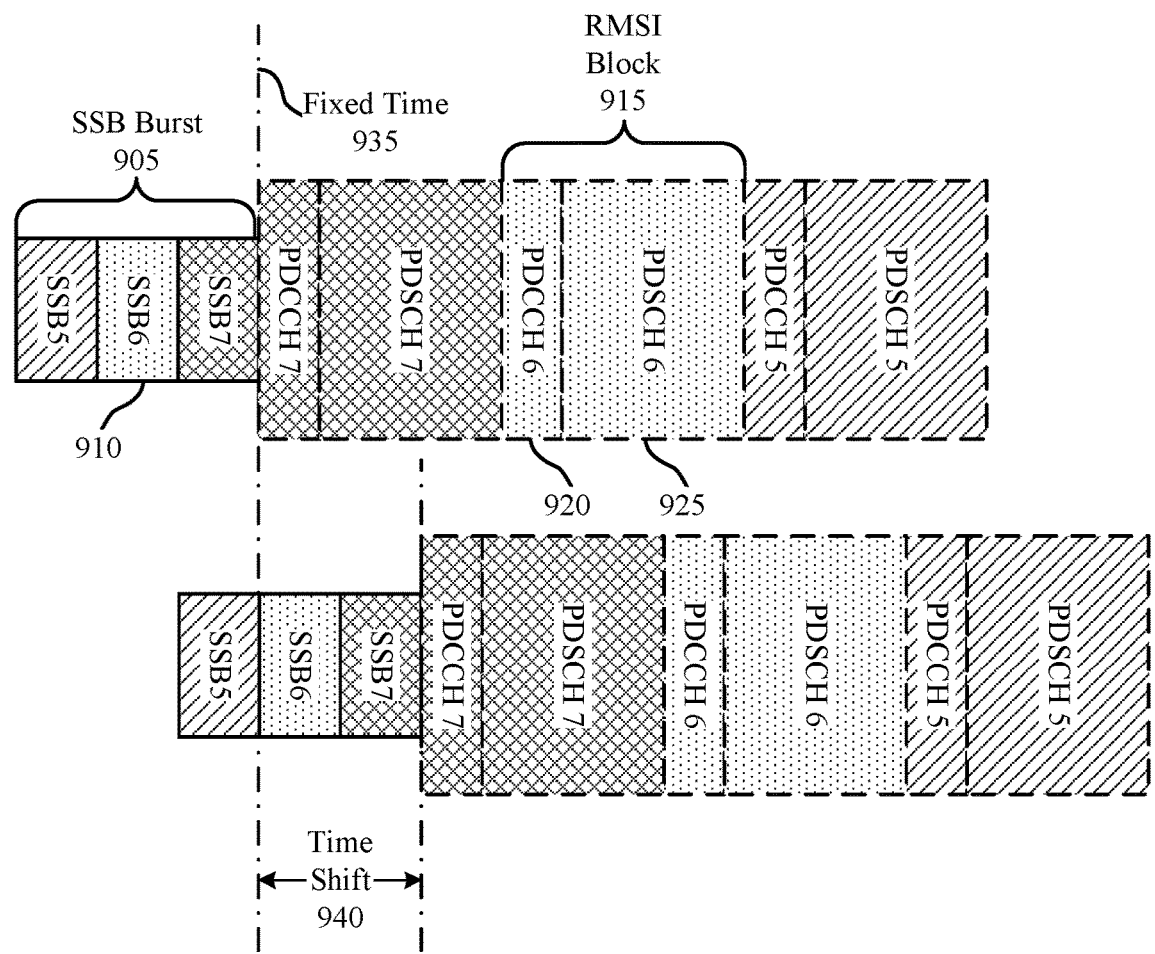
FIG. 9 illustrates an example of an RMSI block burst configuration that supports synchronization signal block and remaining minimum system information integration in unlicensed systems in accordance with aspects of the present disclosure.

FIG. 9 illustrates an example of an RMSI block burst configuration 900 that supports synchronization signal block and remaining minimum system information integration in unlicensed systems in accordance with aspects of the present disclosure. In some examples, the RMSI block burst configuration 900 may implement aspects of wireless communications system 100.

A base station 105 may support an SA configuration or an NSA configuration, or both. In NSA, the base station 105 may not transmit RMSI but may still transmit SSBs 910. To avoid transmission gaps and large overhead in PBCH, the base station 105 may transmit a tight (e.g., back to back) SSB burst (such as an SSB burst 905). In SA configurations, the SSB burst may be followed by an RMSI block burst.

In some cases, the SSB burst 905 and the RMSI block burst may transmitted in an inverse quasi co-location order. For example, a last-transmitted SSB of the SSB burst may correspond to a first-transmitted RMSI block of the RMSI block burst. For example, a last-transmitted SSB of SSB burst 905-a may be quasi co-located to a first-transmitted RMSI block of the RMSI block burst. Similarly, a second-to-last transmitted SSB of the SSB burst corresponds to a second-transmitted RMSI block 915 of the RMSI block burst.

There may be a fixed time 935, which is when the SSB burst 905 ends and the RMSI block burst begins. Thus, each PBCH may not provide explicit RMSI start information. Instead, a PBCH may include information related to RMSI block length, an SSB index, and a number of SSBs transmitted in the SSB burst 905.

The base station 105 may perform an LBT procedure before gaining control of the transmission medium and beginning transmission. The LBT procedure may pass at different times or after a varying number of attempts based on how busy the transmission medium is. Therefore, the base station 105 may begin transmission at different points. In some cases, the base station 105 may shift transmission of the SSB burst 905 and the RMSI block burst based on when the base station 105 passes LBT. Additional information may be included in the PBCH of each SSB to support a floating SSB burst.

Each SSB may still be transmitted if the base station 105 passes LBT within a certain window. PBCH may be used to indicate a time shift 940. The time shift 940 may have a unit of SSBs 910. For example, the time shift 940 may indicate that the SSB burst 905 is started two SSBs 910 behind the normal start time. The UE 115 may use the time shift 940 to determine the boundary between the SSB burst and the RMSI block burst. In this way, the base station 105 still transmits the full SSB burst 905 and the full RMSI block burst with a delay of two SSBs. For example, if an SSB is 4 symbol periods long, the transmission may be 8 symbol periods behind schedule.

The described techniques may also support NSA configurations. For example, the base station 105 may transmit the SSB burst 905 in the same order when the base station 105 while considering the time shift 940. However, the base station 105 may not transmit the RMSI block burst for the NSA configuration.

Figure 10:
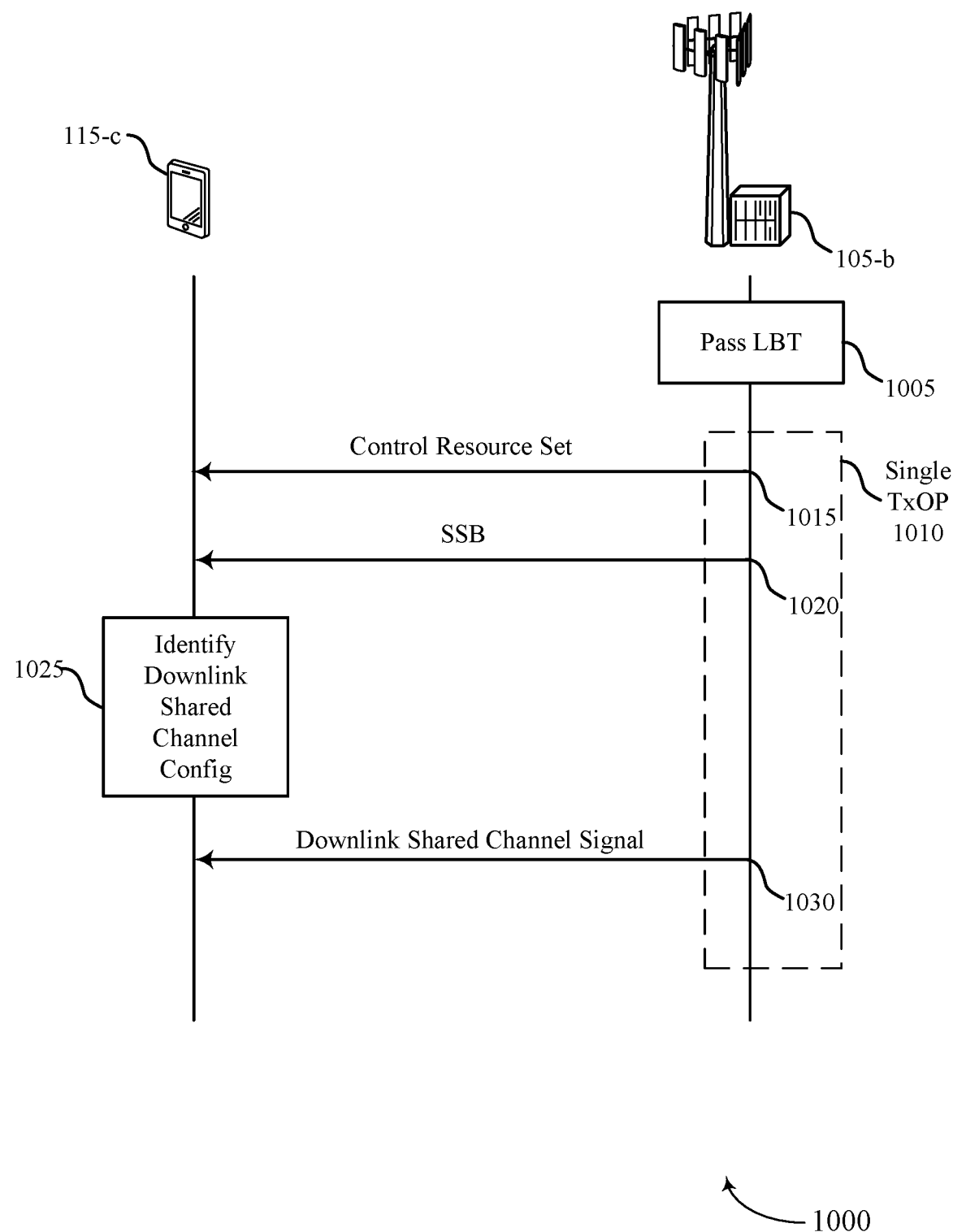
FIG. 10 illustrates an example of a process flow that supports synchronization signal block and remaining minimum system information integration in unlicensed systems in accordance with aspects of the present disclosure.

FIG. 10 illustrates an example of a process flow 1000 that supports synchronization signal block and remaining minimum system information integration in unlicensed systems in accordance with aspects of the present disclosure. In some examples, the process flow 1000 may implement aspects of wireless communications system 100. Process flow 1000 may include base station 105-*b* and UE 115-*c*, which may be respective examples of a base station 105 and a UE 115 described herein. Base station 105-*b* and UE 115-*c* may communicate over a shared radio frequency spectrum band.

At 1005, base station 105-*b* may perform and pass and LBT procedure. For shared wireless communications, base station 105-*b* may have to perform LBT to see if the transmission medium is busy prior to gaining control of the transmission medium. Similarly, if base station 105-*b* has a gap in transmission, it is possible another wireless device performs LBT during the transmission gap. Therefore, base station 105-*b* and UE 115-*c* may implement techniques for SSB and RMSI delivery within a single transmission opportunity 1010. For example, the SSB and RMSI (e.g., RMSI PDCCH and RMSI PDSCH) may be transmitted using a single, continuous transmission in time.

At 1015, base station 105-*b* may transmit a control resource set including a grant for a downlink shared channel carrying system information. In some cases, the system information includes RMSI.

At 1020, base station 105-*b* may transmit, to UE 115-*c*, an SSB of an SSB burst in a slot. The control resource set may be adjacent to a previous SSB of the SSB burst and before the transmitted SSB. In some cases, UE 115-*c* may receive the control resource set in a first and a second symbol period before the received SSB, where the first and second symbol period are adjacent to the pervious SSB in time. For example, the control resource set may be transmitted between SSBs, in some cases, as described in FIG. 4. UE 115-*c* may receive, within the SSB, an indication of a control resource set to monitor for grants for system information. For example, UE 115-*c* may receive an indication of the control resource set transmitted at 1015. In some cases, an indicator such as "RMSI-PDCCH-Config" may be an example of the indicator. For example, the indicator may specify resources used for the control resource set.

UE 115-*b* may identify a configuration for a downlink shared channel signal carrying system information corresponding to the received SSB and the indicated control resource set. In some cases, the configuration may include resource allocation information, such as a start and length indicator value for the downlink shared channel. In some cases, UE 115-*b* may use the indicator in a table to identify the resource allocation scheme for the downlink shared channel.

At 1030, base station 105-*b* may transmit a downlink shared channel signal over the downlink shared channel. The control resource set, the transmitted SSB, and the downlink shared channel signal may be transmitted in a continuous time domain transmission. In some cases, the continuous time domain transmission may be adjacent to a previous continuous time domain transmission including the previous SSB and adjacent to a next continuous time domain transmission including a next SSB.

In some cases, UE 115-*c* may receive the downlink shared channel signal starting from a first symbol period of the received SSB through a last symbol period of the slot. In this example, the downlink shared channel signal carrying system information may be frequency division multiplexed with the received SSB. For example, UE 115-*c* may receive the downlink shared channel signal using techniques described in FIG. 4.

In another example, UE 115-*c* may receive the downlink shared channel signal starting from a first symbol period after the received SSB through a last symbol period of the slot. In this example, the downlink shared channel signal carrying system information may be time division multiplexed with the received SSB. For example, UE 115-*c* may receive the downlink shared channel signal using techniques described in FIG. 5.

In some cases, UE 115-*c* may receive the downlink shared channel signal starting from a first symbol period of a next slot, where the next slot is adjacent to the slot corresponding to the received SSB in time. In some cases, the downlink shared channel signal may be transmitted through a last symbol period of the next slot. For example, UE 115-*c* may receive the downlink shared channel signal using techniques described in FIG. 6. In some cases, UE 115-*c* may receive every fourth SSB.

Figure 11:
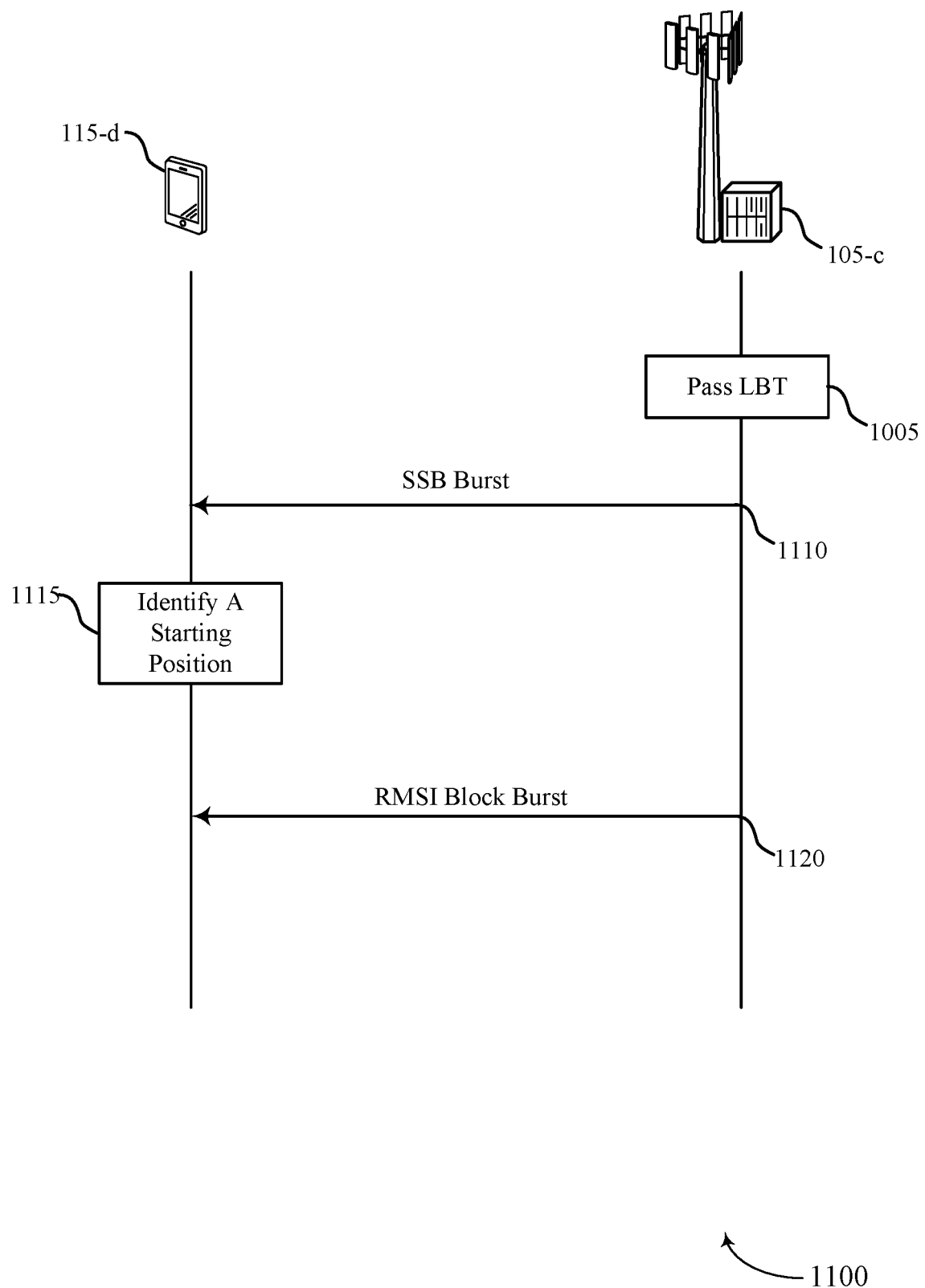
FIG. 11 illustrates an example of a process flow that supports synchronization signal block and remaining minimum system information integration in unlicensed systems in accordance with aspects of the present disclosure.

FIG. 11 illustrates an example of a process flow 1100 that supports synchronization signal block and remaining minimum system information integration in unlicensed systems in accordance with aspects of the present disclosure. In some examples, the process flow 1100 may implement aspects of wireless communications system 100.

Process flow 1100 may include base station 105-*c* and UE 115-*d*, which may be respective examples of a base station 105 and a UE 115 described herein. Base station 105-*c* and UE 115-*d* may communicate over a shared radio frequency spectrum band.

At 1105, base station 105-*c* may perform and pass and LBT procedure. For shared wireless communications, base station 105-*c* may have to perform LBT to see if the transmission medium is busy prior to gaining control of the transmission medium. Similarly, if base station 105-*c* has a gap in transmission, it is possible another wireless device performs LBT during the transmission gap. Therefore, base station 105-*b* and UE 115-*c* may implement techniques for SSB and RMSI delivery within a single transmission opportunity 1010 with a reduced number of transmission gaps. For example, base station 105-*c* may transmit an SSB burst and RMSI block burst in an order which reduced PBCH signaling overhead and supports systems which do not use RMSI.

At 1110, base station 105-*c* may transmit an SSB burst including a set of SSBs. Base station 105-*c* may determine whether to transmit a set of RMSI blocks adjacent to the SSB burst in time, where the set of RMSI blocks are inverse-respectively quasi co-located with the set of SSBs. For example, base station 105-*c* may transmit the RMSI block burst (e.g., the set of RMSI blocks) for an SA configuration, and base station 105-*c* may not transmit the RMSI block burst for an NSA configuration.

Being inverse-respectively quasi co-located, a first-transmitted SSB of the SSB burst may be quasi co-located with a last RMSI block of the RMSI block burst. Similarly, a last-transmitted SSB of the SSB burst may be quasi co-located with a first-transmitted RMSI block of the RMSI block burst.

In some cases, base station 105-*c* may include some information in PBCH of the SSBs in the SSB burst related to RMSI block length. For example, the PBCH may indicate how long an RMSI block of the RMSI block burst is, including RMSI PDCCH and RMSI PDSCH. In some cases, base station 105-*c* may also include an indication of an SSB index for each SSB of the SSB burst. For example, a PBCH may indicate an SSB is the sixth of eight transmitted SSBs.

In some cases, UE 115-*d* may receive an SSB of the SSB burst. UE 115-*d* may identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted. As described herein, at least the length of the RMSI block may be indicated in the PBCH of the received SSB. In some cases, the starting position or an indication of whether the set of RMSI blocks are transmitted, or both, may also be included in PBCH.

At 1120, base station 105-*c* may transmit an RMSI block of the set of RMSI blocks at a starting position based on a number of SSBs between an SSB corresponding to the RMSI block and a starting position for the set of RMSI blocks and a length of the RMSI block. In some cases, base station 105-*c* may transmit the RMSI block of the set of RMSI blocks based on whether the set of RMSI blocks are transmitted. UE 115-*d* may monitor for the RMSI block based on the identified starting position. In some cases, UE 115-*d* may monitor based on the starting position and whether the set of RMSI blocks are transmitted.

In some cases, base station 105-*c* may identify a time shift for the SSB based on the LBT procedure. Base station 105-*c* may indicate the starting position for the transmitted RMSI block based on the time shift. For example, if base station 105-*c* passes LBT after an expected start time, base station 105-*c* may instead transmit the SSB burst and the RMSI block burst with a time shift. This is described in more detail in FIG. 9.

Figure 12:
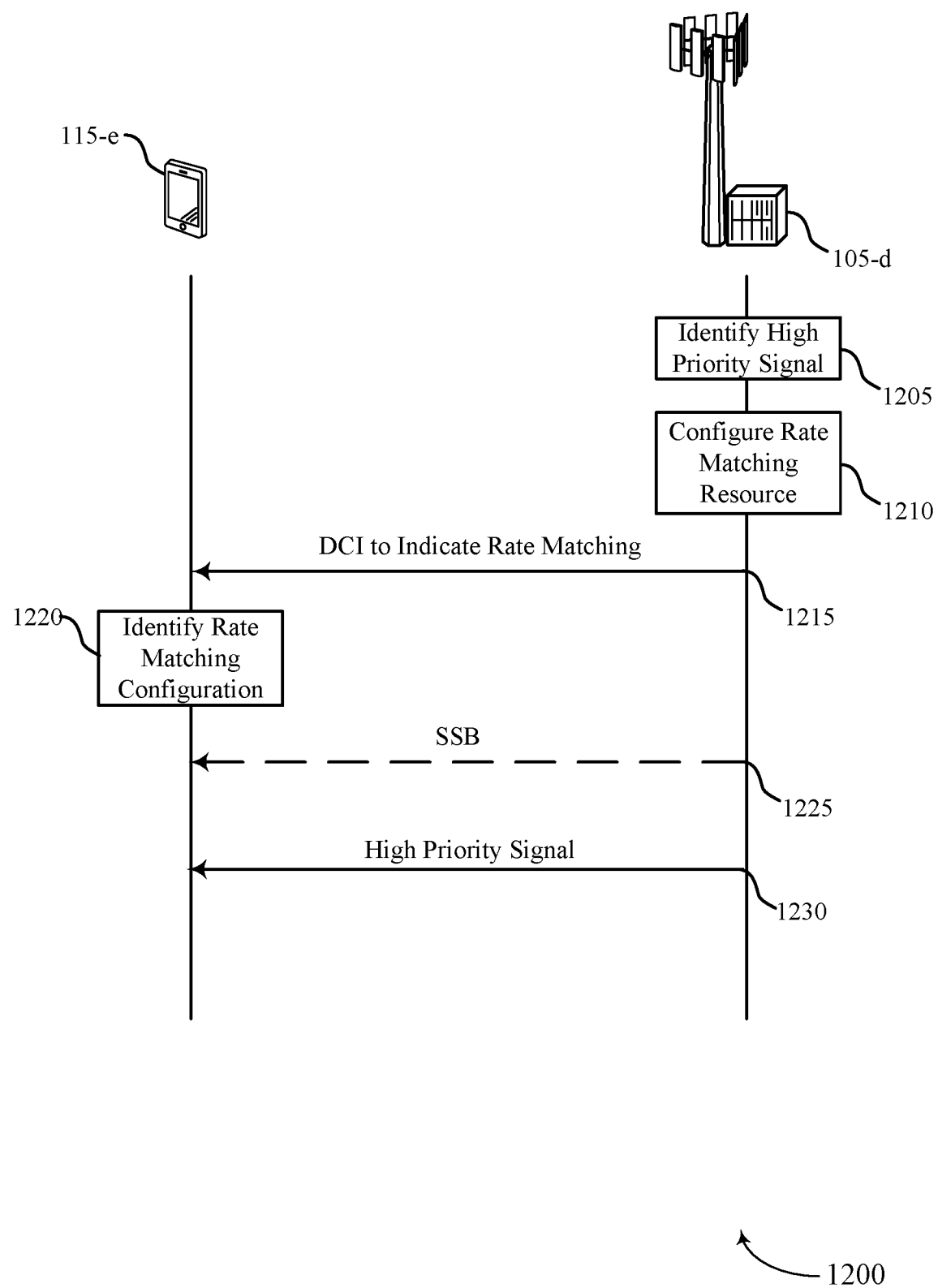
FIG. 12 illustrates an example of a process flow that supports synchronization signal block and remaining minimum system information integration in unlicensed systems in accordance with aspects of the present disclosure.

In another example, base station 105-*c* may identify a time delay based on the LBT procedure. Base station 105-*c* may then transmit a subset of SSBs of the SSB burst based on the time delay. In some cases, base station 105-*c* may transmit a subset of the SSBs of the SSB burst or the subset of the SSBs and a subset of RMSI FIG. 12 illustrates an example of a process flow 1200 that supports synchronization signal block and remaining minimum system information integration in unlicensed systems in accordance with aspects of the present disclosure. In some examples, the process flow 1200 may implement aspects of wireless communications system 100.

At 1205, base station 105-*d* may identify a high priority signal. At 1210, base station 105-*d* may configure a rate matching resource set to include time and frequency domain resources used for SSB transmission. In some cases, base station 105-*d* may over-provision SSBs (e.g., use more than a needed number of SSBs) to have some flexibility of skipping some of the SSBs in order to send urgent traffic (e.g., the identified high priority signal).

At 1215, base station 105-*d* may transmit a downlink grant to UE 115-*e* including a bit to indicate downlink shared channel rate matching. The downlink grant may be included in DCI.

UE 115-*e* may identify the high priority signal based on the bit indicating downlink shared channel rate matching. UE 115-*e* may identify a configuration for the rate matching based on the DCI carrying the grant. For example, the DCI may include a UE-specific bitmap indication which SSBs are transmitted or which SSBs are not transmitted.

In some cases, base station 105-*d* may not commit any SSBs via RMSI. Base station 105-*d* may then dynamically rate match around the SSBs if transmitted and indicate the rate matching configuration to UE 115-*e* in DCI. Then, base station 105-*d* may use the resource if an SSB is not transmitted. In another example, base station 105-*d* may commit the provisioned SSBs via RMSI. If base station 105-*d* does not transmit an SSB on the resource, base station 105-*d* may transmit a UE-specific bitmap to overwrite an index of the SSB bitmap to a 0 for the corresponding SSB. Thus, base station 105-*d* may use UE-specific DCI signaling to dynamically rate match around the SSBs if transmitted and use the resource if an SSB is not transmitted. Either way, if there is no urgent traffic, base station 105-*d* may transmit a minimum set of SSBs and remaining redundant SSBs may be reused for other traffic.

For example, at 1225, base station 105-*d* may transmit an SSB based on the UE-specific bitmap. For example, the SSB may be one of four actually transmitted SSBs, when base station 105-*d* provisions eight SSBs. Or, the SSB may be one of four SSBs indicated by the UE-specific bitmap, when a default number of SSBs is zero (e.g., corresponding to an all-zero default SSB bitmap). At 1230, base station 105-*d* may transmit the high priority signal to UE 115-*e* on resource of an SSB (e.g., an over-provisioned, not actually transmitted SSB).

Figure 13:
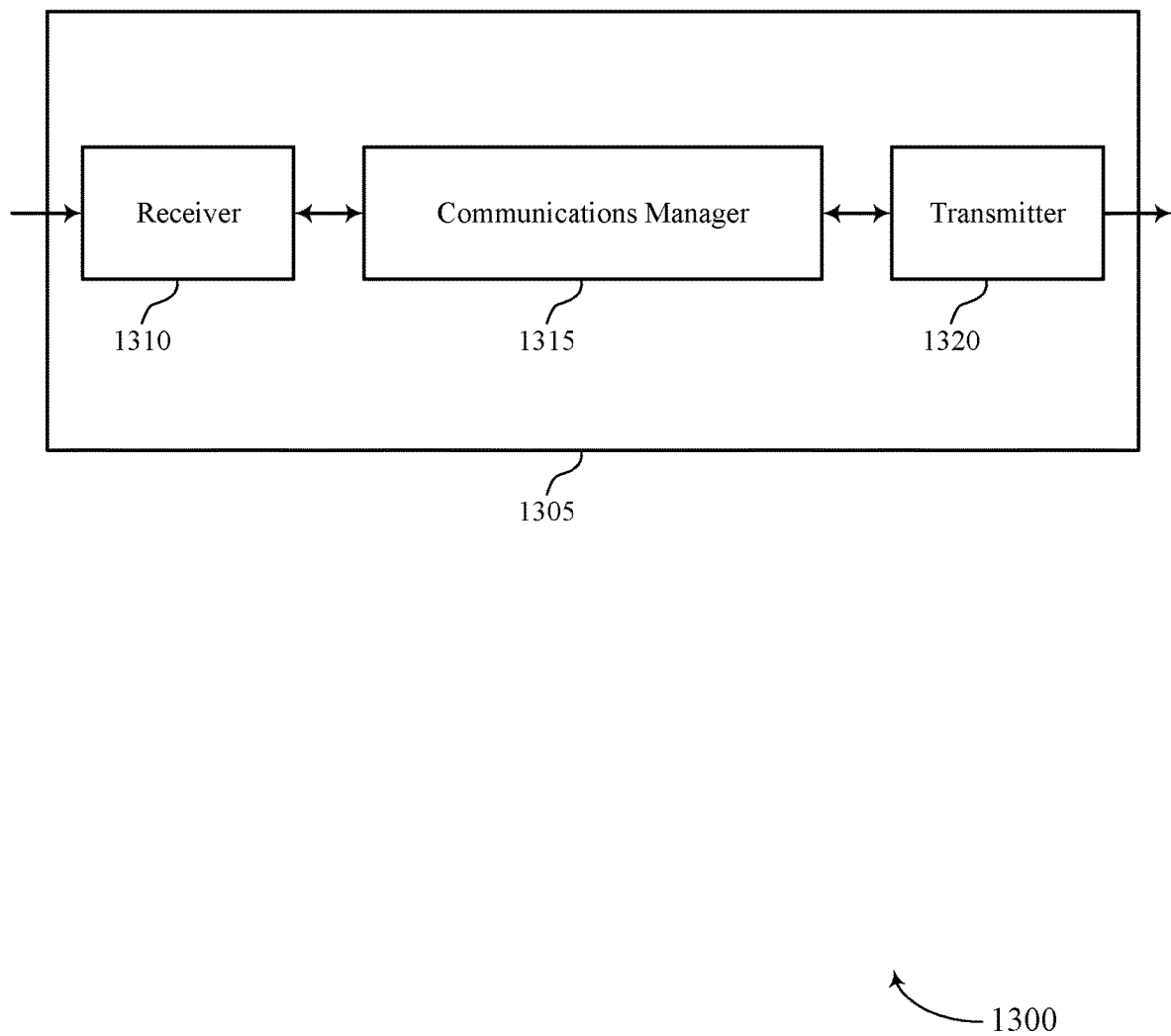
FIGS. 13 and 14 show block diagrams of devices that support synchronization signal block and remaining minimum system information integration in unlicensed systems in accordance with aspects of the present disclosure.

FIG. 13 shows a block diagram 1300 of a device 1305 that supports synchronization signal block and remaining minimum system information integration in unlicensed systems in accordance with aspects of the present disclosure. The device 1305 may be an example of aspects of a UE 115 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to synchronization signal block and remaining minimum system information integration in unlicensed systems, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may receive, from a base station, an SSB of an SSB burst in a slot, receive, within the SSB, an indication of a control resource set to monitor for grants for system information on a downlink shared channel, where the control resource set is after a previous SSB of the SSB burst and before the received SSB, identify a configuration for a downlink shared channel signal carrying system information corresponding to the received SSB and the indicated control resource set, and receive, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission for a next SSB. The communications manager 1315 may also receive, from a base station, an SSB of an SSB burst including a set of SSBs, determine whether a set of RMSI blocks are transmitted, identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted, and monitor for the RMSI block based on the identified starting position and whether the set of RMSI blocks are transmitted. The communications manager 1315 may also receive a downlink grant from a base station including a bit indicating downlink shared channel rate matching, identify a high priority signal based on the bit indicating downlink shared channel rate matching, rate matching around an SSB based on the identified high priority signal, and receive the high priority signal from the base station on resources of the SSB based on the bitmap. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
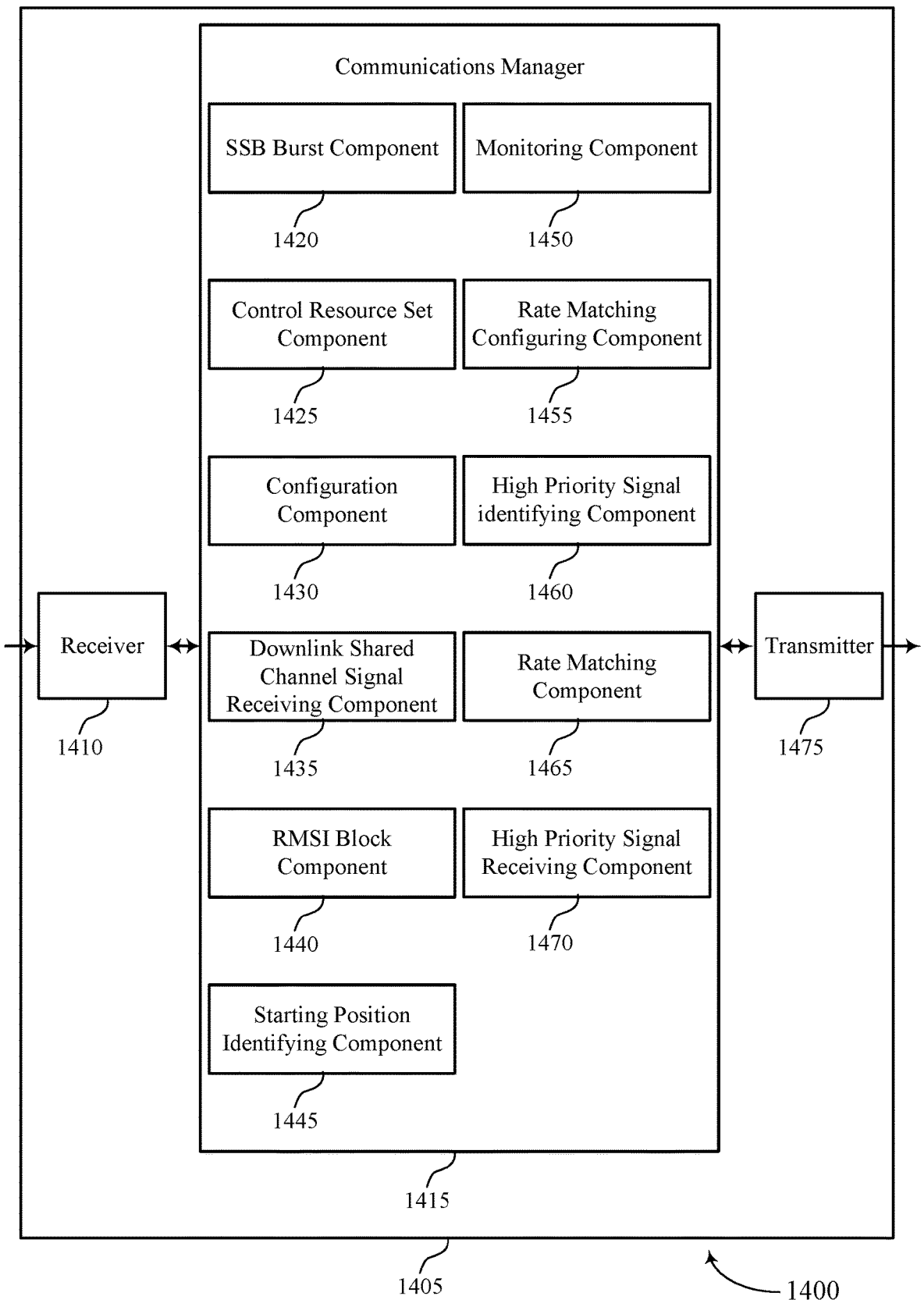

FIG. 14 shows a block diagram 1400 of a device 1405 that supports synchronization signal block and remaining minimum system information integration in unlicensed systems in accordance with aspects of the present disclosure. The device 1405 may be an example of aspects of a device 1305, or a UE 115 as described herein. The device 1405 may include a receiver 1410, a communications manager 1415, and a transmitter 1475. The device 1405 may also include a processor. Each of these components may be in communication with one another (e.g., via one or more buses).

The receiver 1410 may receive information such as packets, user data, or control information associated with various information channels (e.g., control channels, data channels, and information related to synchronization signal block and remaining minimum system information integration in unlicensed systems, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a SSB burst component 1420, a control resource set component 1425, a configuration component 1430, a downlink shared channel signal receiving component 1435, a RMSI block component 1440, a starting position identifying component 1445, a monitoring component 1450, a rate matching configuring component 1455, a high priority signal identifying component 1460, a rate matching component 1465, and a high priority signal receiving component 1470. The communications manager 1415 may be an example of aspects of the communications manager 1610 described herein.

The SSB burst component 1420 may receive, from a base station, an SSB of an SSB burst in a slot. The control resource set component 1425 may receive, within the SSB, an indication of a control resource set to monitor for grants for system information on a downlink shared channel, where the control resource set is after a previous SSB of the SSB burst and before the received SSB. The configuration component 1430 may identify a configuration for a downlink shared channel signal carrying system information corresponding to the received SSB and the indicated control resource set.

The downlink shared channel signal receiving component 1435 may receive, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission for a next SSB.

The SSB burst component 1420 may receive, from a base station, an SSB of an SSB burst including a set of SSBs. The RMSI block component 1440 may determine whether a set of RMSI blocks are transmitted. The starting position identifying component 1445 may identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted. The monitoring component 1450 may monitor for the RMSI block based on the identified starting position and whether the set of RMSI blocks are transmitted.

The rate matching configuring component 1455 may receive a downlink grant from a base station including a bit indicating downlink shared channel rate matching. The high priority signal identifying component 1460 may identify a high priority signal based on the bit indicating downlink shared channel rate matching. The rate matching component 1465 may rate matching around an SSB based on the identified high priority signal. The high priority signal receiving component 1470 may receive the high priority signal from the base station on resources of the SSB based on the bitmap.

The transmitter 1475 may transmit signals generated by other components of the device 1405. In some examples, the transmitter 1475 may be collocated with a receiver 1410 in a transceiver module. For example, the transmitter 1475 may be an example of aspects of the transceiver 1620 described with reference to FIG. 16. The transmitter 1475 may utilize a single antenna or a set of antennas.

Figure 15:
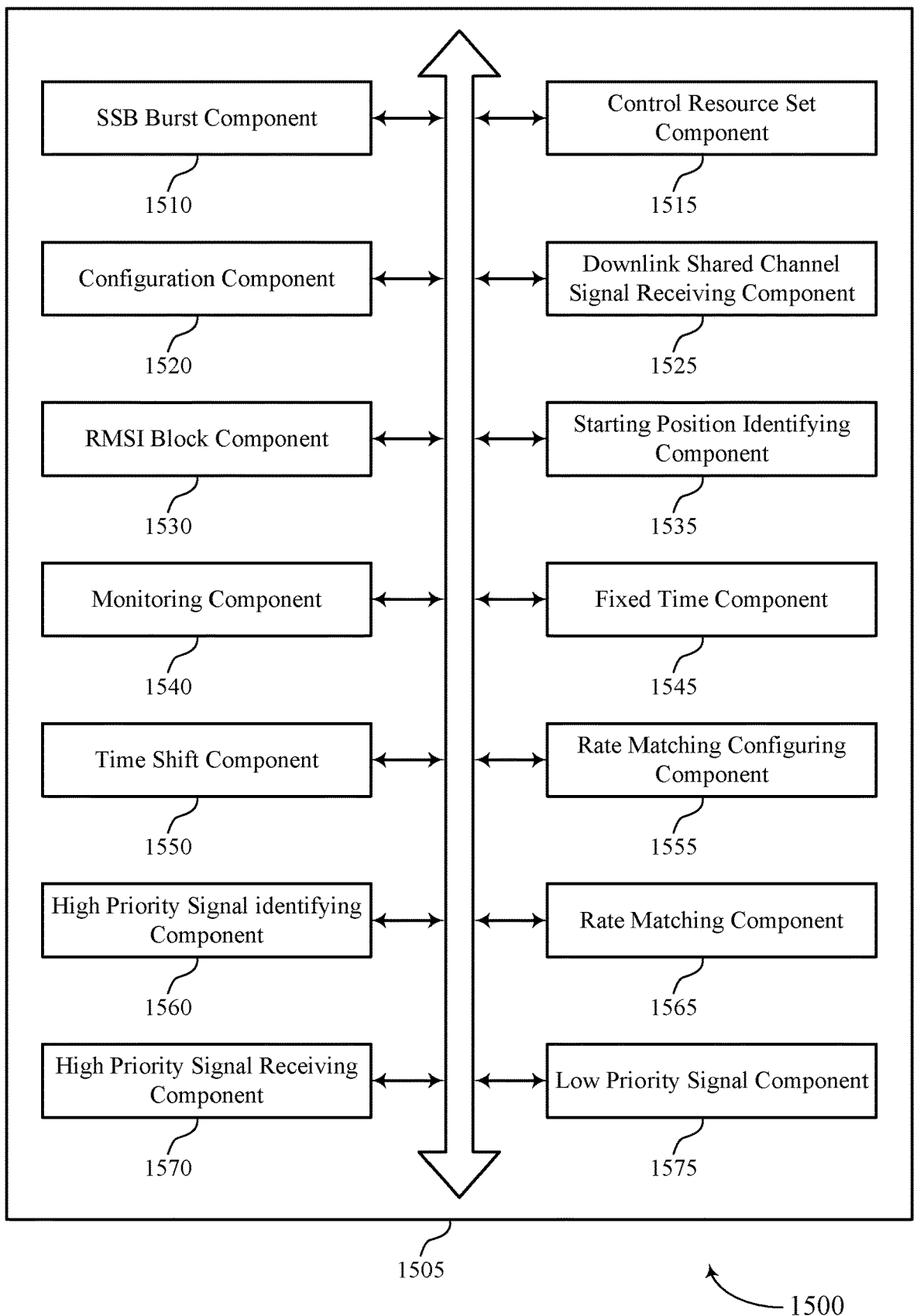
FIG. 15 shows a block diagram of a communications manager that supports synchronization signal block and remaining minimum system information integration in unlicensed systems in accordance with aspects of the present disclosure.

FIG. 15 shows a block diagram 1500 of a communications manager 1505 that supports synchronization signal block and remaining minimum system information integration in unlicensed systems in accordance with aspects of the present disclosure. The communications manager 1505 may be an example of aspects of a communications manager 1315, a communications manager 1415, or a communications manager 1610 described herein. The communications manager 1505 may include a SSB burst component 1510, a control resource set component 1515, a configuration component 1520, a downlink shared channel signal receiving component 1525, a RMSI block component 1530, a starting position identifying component 1535, a monitoring component 1540, a fixed time component 1545, a time shift component 1550, a rate matching configuring component 1555, a high priority signal identifying component 1560, a rate matching component 1565, a high priority signal receiving component 1570, and a low priority signal component 1575. Each of these modules may communicate, directly or indirectly, with one another (e.g., via one or more buses).

The SSB burst component 1510 may receive, from a base station, an SSB of an SSB burst in a slot. In some examples, the SSB burst component 1510 may receive, from a base station, an SSB of an SSB burst including a set of SSBs. In some cases, the received SSB is quasi co-located with the received RMSI block.

The control resource set component 1515 may receive, within the SSB, an indication of a control resource set to monitor for grants for system information on a downlink shared channel, where the control resource set is after a previous SSB of the SSB burst and before the received SSB.

In some examples, the control resource set component 1515 may receive the control resource set in a first and a second symbol period before the received SSB, where the first and second symbol period are adjacent to the previous SSB in time. In some examples, the control resource set component 1515 may receive the downlink shared channel signal starting from a first symbol period of the received SSB through a last symbol period of the slot. In some cases, the downlink shared channel signal carrying system information is frequency division multiplexed with the received SSB.

The configuration component 1520 may identify a configuration for a downlink shared channel signal carrying system information corresponding to the received SSB and the indicated control resource set.

The downlink shared channel signal receiving component 1525 may receive, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission for a next SSB. In some cases, the received SSB and the previous SSB may each have an even SSB index or an odd SSB index In some examples, the downlink shared channel signal receiving component 1525 may receive the downlink shared channel signal starting from a first symbol period after the received SSB through a last symbol period of the slot. In some cases, a resource size for the downlink shared channel is configurable. In some examples, the downlink shared channel signal receiving component 1525 may receive the downlink shared channel signal starting from a first symbol period of the received SSB until a first symbol period of the next SSB. In some cases, the downlink shared channel signal carrying system information is time division multiplexed with the received SSB. In some cases, the downlink shared channel signal includes RMSI.

The RMSI block component 1530 may determine whether a set of RMSI blocks are transmitted. The starting position identifying component 1535 may identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted. In some examples, the starting position identifying component 1535 may receive an indicator of a length of the RMSI block in the received SSB.

The monitoring component 1540 may monitor for the RMSI block based on the identified starting position and whether the set of RMSI blocks are transmitted. In some cases, the RMSI block includes a downlink control channel signal and a downlink shared channel signal, where a payload for the downlink shared channel signal includes system information.

The fixed time component 1545 may identify a fixed time corresponding to an end for transmission of the SSB burst and a start for transmission of the set of RMSI blocks, where the starting position for the received RMSI block is identified based on the fixed time. The time shift component 1550 may identify an indicator of a time shift in the received SSB, where the time shift is based on a LBT procedure performed by the base station. In some examples, the time shift component 1550 may identify the starting position for the set of RMSI blocks based on the time shift.

The rate matching configuring component 1555 may receive a downlink grant from a base station including a bit indicating downlink shared channel rate matching. The high priority signal identifying component 1560 may identify a high priority signal based on the bit indicating downlink shared channel rate matching. The rate matching component 1565 may rate matching around an SSB based on the identified high priority signal. The high priority signal receiving component 1570 may receive the high priority signal from the base station on resources of the SSB based on the bitmap. In some examples, the high priority signal receiving component 1570 may identify a transmitted SSB bitmap to all zeroes, where the high priority signal is received based on the bitmap.

The low priority signal component 1575 may receive an indication to disable rate matching for a next SSB. In some examples, the low priority signal component 1575 may identify a low priority signal based on the indication. In some examples, the low priority signal component 1575 may receive the next SSB. In some examples, the low priority signal component 1575 may receive the low priority signal excluding resources for the next SSB.

Figure 16:
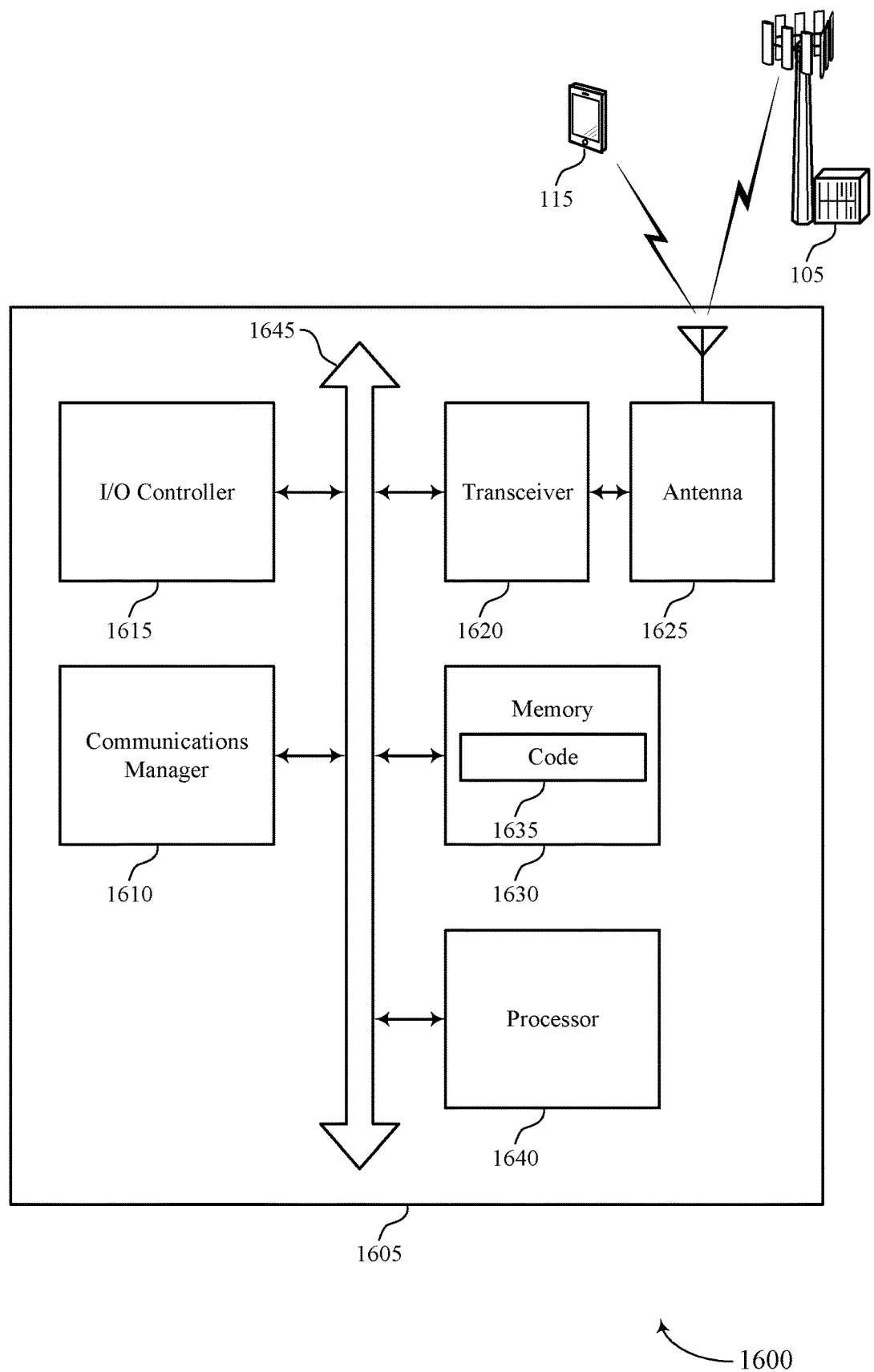
FIG. 16 shows a diagram of a system including a device that supports synchronization signal block and remaining minimum system information integration in unlicensed systems in accordance with aspects of the present disclosure.

FIG. 16 shows a diagram of a system 1600 including a device 1605 that supports synchronization signal block and remaining minimum system information integration in unlicensed systems in accordance with aspects of the present disclosure. The device 1605 may be an example of or include the components of device 1305, device 1405, or a UE 115 as described herein. The device 1605 may include components for bi-directional voice and data communications including components for transmitting and receiving communications, including a communications manager 1610, an I/O controller 1615, a transceiver 1620, an antenna 1625, memory 1630, and a processor 1640. These components may be in electronic communication via one or more buses (e.g., bus 1645).

The communications manager 1610 may receive, from a base station, an SSB of an SSB burst in a slot, receive, within the SSB, an indication of a control resource set to monitor for grants for system information on a downlink shared channel, where the control resource set is after a previous SSB of the SSB burst and before the received SSB, identify a configuration for a downlink shared channel signal carrying system information corresponding to the received SSB and the indicated control resource set, and receive, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission for a next SSB. The communications manager 1610 may also receive, from a base station, an SSB of an SSB burst including a set of SSBs, determine whether a set of RMSI blocks are transmitted, identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted, and monitor for the RMSI block based on the identified starting position and whether the set of RMSI blocks are transmitted. The communications manager 1610 may also receive a downlink grant from a base station including a bit indicating downlink shared channel rate matching, identify a high priority signal based on the bit indicating downlink shared channel rate matching, rate matching around an SSB based on the identified high priority signal, and receive the high priority signal from the base station on resources of the SSB based on the bitmap.

The I/O controller 1615 may manage input and output signals for the device 1605. The I/O controller 1615 may also manage peripherals not integrated into the device 1605. In some cases, the I/O controller 1615 may represent a physical connection or port to an external peripheral. In some cases, the I/O controller 1615 may utilize an operating system such as iOS®, ANDROID®, MS-DOS®, MS-WINDOWS®, OS/2®, UNIX®, LINUX®, or another known operating system. In other cases, the I/O controller 1615 may represent or interact with a modem, a keyboard, a mouse, a touchscreen, or a similar device. In some cases, the I/O controller 1615 may be implemented as part of a processor. In some cases, a user may interact with the device 1605 via the I/O controller 1615 or via hardware components controlled by the I/O controller 1615.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM and ROM. The memory 1630 may store computer-readable, computer-executable code 1635 including instructions that, when executed, cause the processor to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting synchronization signal block and remaining minimum system information integration in unlicensed systems).

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
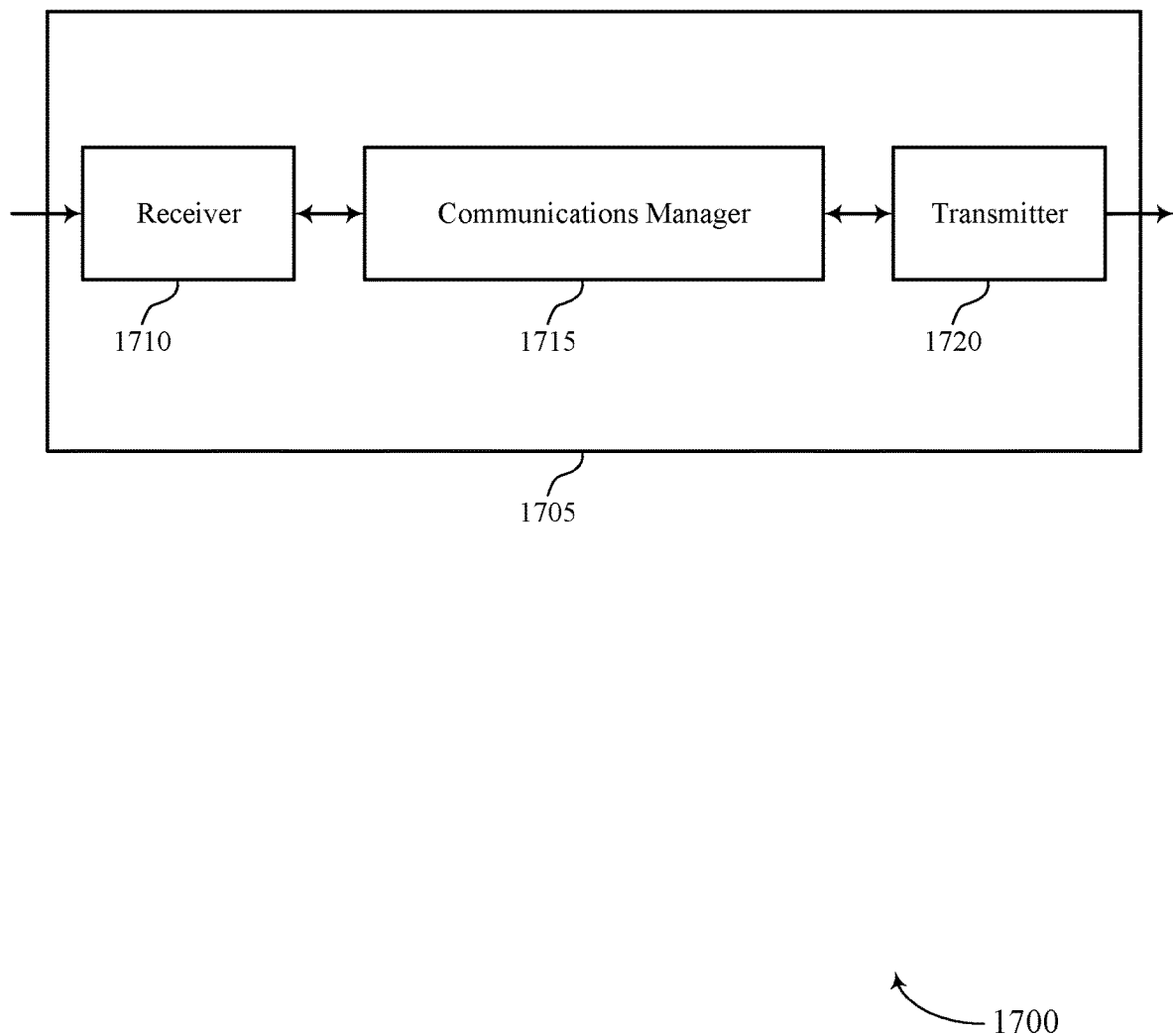
FIGS. 17 and 18 show block diagrams of devices that support synchronization signal block and remaining minimum system information integration in unlicensed systems in accordance with aspects of the present disclosure.

FIG. 17 shows a block diagram 1700 of a device 1705 that supports synchronization signal block and remaining minimum system information integration in unlicensed systems in accordance with aspects of the present disclosure. The device 1705 may be an example of aspects of a base station 105 as described herein. The device 1705 may include a receiver 1710, a communications manager 1715, and a transmitter 1720. The device 1705 may also include a processor. Each of these components may be in communication with one another (e.g., via one or more buses).

The receiver 1710 may receive information such as packets, user data, or control information associated with various information channels (e.g., control channels, data channels, and information related to synchronization signal block and remaining minimum system information integration in unlicensed systems, etc.). Information may be passed on to other components of the device 1705. The receiver 1710 may be an example of aspects of the transceiver 2020 described with reference to FIG. 20. The receiver 1710 may utilize a single antenna or a set of antennas.

The communications manager 1715 may transmit a control resource set including a grant for a downlink shared channel carrying system information, transmit, to a UE, an SSB of an SSB burst in a slot, where the control resource set is transmitted adjacent to a previous SSB of the SSB burst and before the transmitted SSB, and transmit, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB. The communications manager 1715 may also transmit an SSB burst including a set of SSBs, determine whether to transmit a set of RMSI blocks adjacent to the SSB burst in time, where the set of RMSI blocks are inverse-respectively quasi co-located with the set of SSBs, and transmit an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted. The communications manager 1715 may also identify a high priority signal, configure a rate matching resource set to include time and frequency domain resources used for SSB transmission, transmit a downlink grant to a UE including a bit to indicate downlink shared channel rate matching, refrain from transmitting an SSB based on the identified high priority signal, and transmit the high priority signal from the base station on resources of the SSB. The communications manager 1715 may be an example of aspects of the communications manager 2010 described herein.

The communications manager 1715, or its sub-components, may be implemented in hardware, code (e.g., software or firmware) executed by a processor, or any combination thereof. If implemented in code executed by a processor, the functions of the communications manager 1715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1715, or its sub-components, may be physically located at various positions, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1720 may transmit signals generated by other components of the device 1705. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
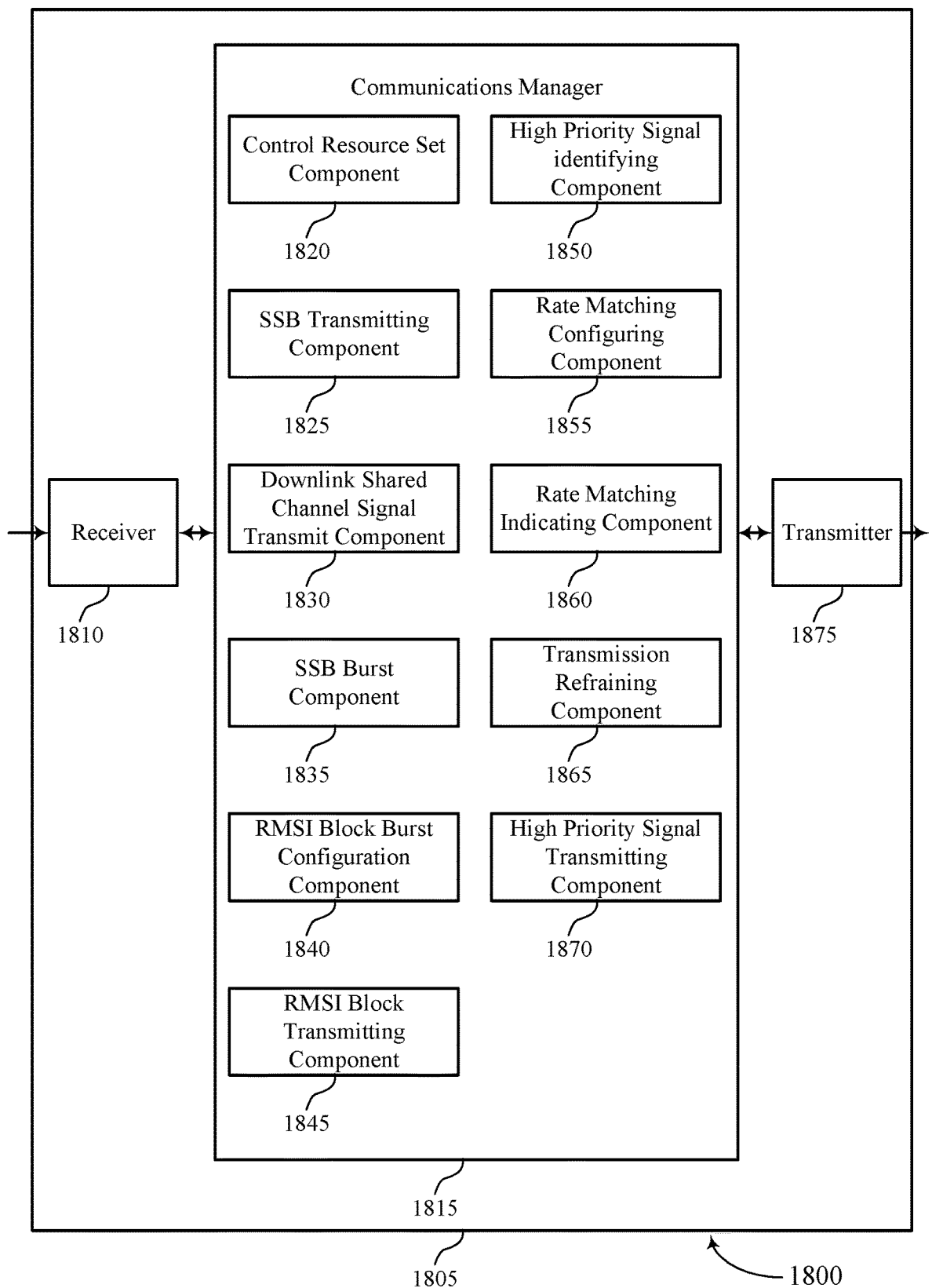

FIG. 18 shows a block diagram 1800 of a device 1805 that supports synchronization signal block and remaining minimum system information integration in unlicensed systems in accordance with aspects of the present disclosure. The device 1805 may be an example of aspects of a device 1705, or a base station 105 as described herein. The device 1805 may include a receiver 1810, a communications manager 1815, and a transmitter 1875. The device 1805 may also include a processor. Each of these components may be in communication with one another (e.g., via one or more buses).

The receiver 1810 may receive information such as packets, user data, or control information associated with various information channels (e.g., control channels, data channels, and information related to synchronization signal block and remaining minimum system information integration in unlicensed systems, etc.). Information may be passed on to other components of the device 1805. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a control resource set component 1820, a SSB transmitting component 1825, a downlink shared channel signal transmitting component 1830, a SSB burst component 1835, a RMSI block burst configuration component 1840, a RMSI block transmitting component 1845, a high priority signal identifying component 1850, a rate matching configuring component 1855, a rate matching indicating component 1860, a transmission refraining component 1865, and a high priority signal transmitting component 1870. The communications manager 1815 may be an example of aspects of the communications manager 2010 described herein.

The control resource set component 1820 may transmit a control resource set including a grant for a downlink shared channel carrying system information. The SSB transmitting component 1825 may transmit, to a UE, an SSB of an SSB burst in a slot, where the control resource set is transmitted adjacent to a previous SSB of the SSB burst and before the transmitted SSB.

The downlink shared channel signal transmitting component 1830 may transmit, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB.

The SSB burst component 1835 may transmit an SSB burst including a set of SSBs. The RMSI block burst configuration component 1840 may determine whether to transmit a set of RMSI blocks adjacent to the SSB burst in time, where the set of RMSI blocks are inverse-respectively quasi co-located with the set of SSBs. The RMSI block transmitting component 1845 may transmit an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted.

The high priority signal identifying component 1850 may identify a high priority signal. The rate matching configuring component 1855 may configure a rate matching resource set to include time and frequency domain resources used for SSB transmission. The rate matching indicating component 1860 may transmit a downlink grant to a UE including a bit to indicate downlink shared channel rate matching. The transmission refraining component 1865 may refrain from transmitting an SSB based on the identified high priority signal. The high priority signal transmitting component 1870 may transmit the high priority signal from the base station on resources of the SSB.

The transmitter 1875 may transmit signals generated by other components of the device 1805. In some examples, the transmitter 1875 may be collocated with a receiver 1810 in a transceiver module. For example, the transmitter 1875 may be an example of aspects of the transceiver 2020 described with reference to FIG. 20. The transmitter 1875 may utilize a single antenna or a set of antennas.

Figure 19:
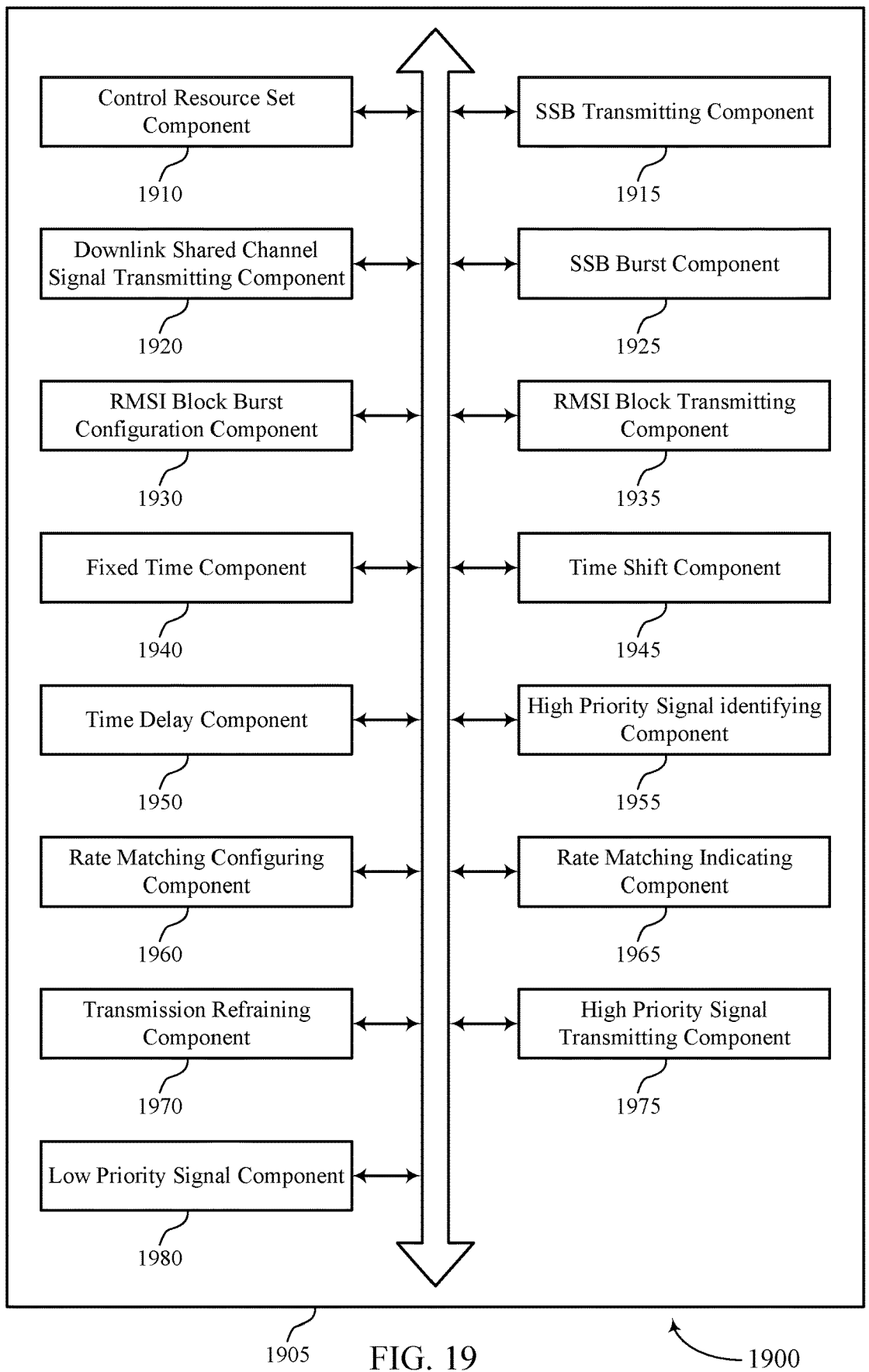
FIG. 19 shows a block diagram of a communications manager that supports synchronization signal block and remaining minimum system information integration in unlicensed systems in accordance with aspects of the present disclosure.

FIG. 19 shows a block diagram 1900 of a communications manager 1905 that supports synchronization signal block and remaining minimum system information integration in unlicensed systems in accordance with aspects of the present disclosure. The communications manager 1905 may be an example of aspects of a communications manager 1715, a communications manager 1815, or a communications manager 2010 described herein. The communications manager 1905 may include a control resource set component 1910, a SSB transmitting component 1915, a downlink shared channel signal transmitting component 1920, a SSB burst component 1925, a RMSI block burst configuration component 1930, a RMSI block transmitting component 1935, a fixed time component 1940, a time shift component 1945, a time delay component 1950, a high priority signal identifying component 1955, a rate matching configuring component 1960, a rate matching indicating component 1965, a transmission refraining component 1970, a high priority signal transmitting component 1975, and a low priority signal component 1980. Each of these modules may communicate, directly or indirectly, with one another (e.g., via one or more buses).

The control resource set component 1910 may transmit a control resource set including a grant for a downlink shared channel carrying system information. In some examples, the control resource set component 1910 may transmit the control resource set in a first and a second symbol period before the transmitted SSB, where the first and second symbol period are adjacent to the previous SSB in time.

The SSB transmitting component 1915 may transmit, to a UE, an SSB of an SSB burst in a slot, where the control resource set is transmitted adjacent to a previous SSB of the SSB burst and before the transmitted SSB.

The downlink shared channel signal transmitting component 1920 may transmit, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB.

In some examples, the downlink shared channel signal transmitting component 1920 may transmit the downlink shared channel signal starting from a first symbol period of the transmitted SSB through a last symbol period of the slot. In some examples, the downlink shared channel signal transmitting component 1920 may transmit the downlink shared channel signal starting from a first symbol period after the transmitted SSB through a last symbol period of the slot. In some examples, the downlink shared channel signal transmitting component 1920 may transmit the downlink shared channel starting from a first symbol period of the transmitted SSB until a first symbol period of the next SSB.

In some cases, the downlink shared channel signal carrying system information is frequency division multiplexed with the transmitted SSB. In some cases, the downlink shared channel signal carrying system information is time division multiplexed with the transmitted SSB. In some cases, the downlink shared channel signal includes RMSI.

The SSB burst component 1925 may transmit an SSB burst including a set of SSBs. The RMSI block burst configuration component 1930 may determine whether to transmit a set of RMSI blocks adjacent to the SSB burst in time, where the set of RMSI blocks are inverse-respectively quasi co-located with the set of SSBs. In some cases, the SSB burst and the set of RMSI blocks are adjacent in time.

The RMSI block transmitting component 1935 may transmit an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted. In some examples, the RMSI block transmitting component 1935 may transmit an indicator of a length of the transmitted RMSI block in the SSB corresponding to the transmitted RMSI block. In some cases, the transmitted RMSI block includes a downlink control channel signal and a downlink shared channel signal, where a payload for the downlink shared channel signal includes system information.

The fixed time component 1940 may identify a fixed time corresponding to an end for transmission of the SSB burst and a start for transmission of the set of RMSI blocks, where the starting position for the transmitted RMSI block is indicated based on the fixed time.

The time shift component 1945 may perform a LBT procedure. In some examples, the time shift component 1945 may identify a time shift for the SSB based on the LBT procedure. In some examples, the time shift component 1945 may indicate the starting position for the transmitted RMSI block based on the time shift.

The time delay component 1950 may perform a LBT procedure. In some examples, the time delay component 1950 may identify a time delay based on the LBT procedure. In some examples, the time delay component 1950 may transmit a subset of SSBs of the SSB burst based on the time delay.

The high priority signal identifying component 1955 may identify a high priority signal. The rate matching configuring component 1960 may configure a rate matching resource set to include time and frequency domain resources used for SSB transmission. The rate matching indicating component 1965 may transmit a downlink grant to a UE including a bit to indicate downlink shared channel rate matching. The transmission refraining component 1970 may refrain from transmitting an SSB based on the identified high priority signal. The high priority signal transmitting component 1975 may transmit the high priority signal from the base station on resources of the SSB. In some examples, the high priority signal transmitting component 1975 may configure a transmitted SSB bitmap to all zeroes, where the high priority signal is transmitted based on the bitmap.

The low priority signal component 1980 may identify a low priority signal. In some examples, the low priority signal component 1980 may indicate to the UE to disable rate matching for a next SSB. In some examples, the low priority signal component 1980 may transmit the next SSB. In some examples, the low priority signal component 1980 may transmit the low priority signal excluding resources for the next SSB.

Figure 20:
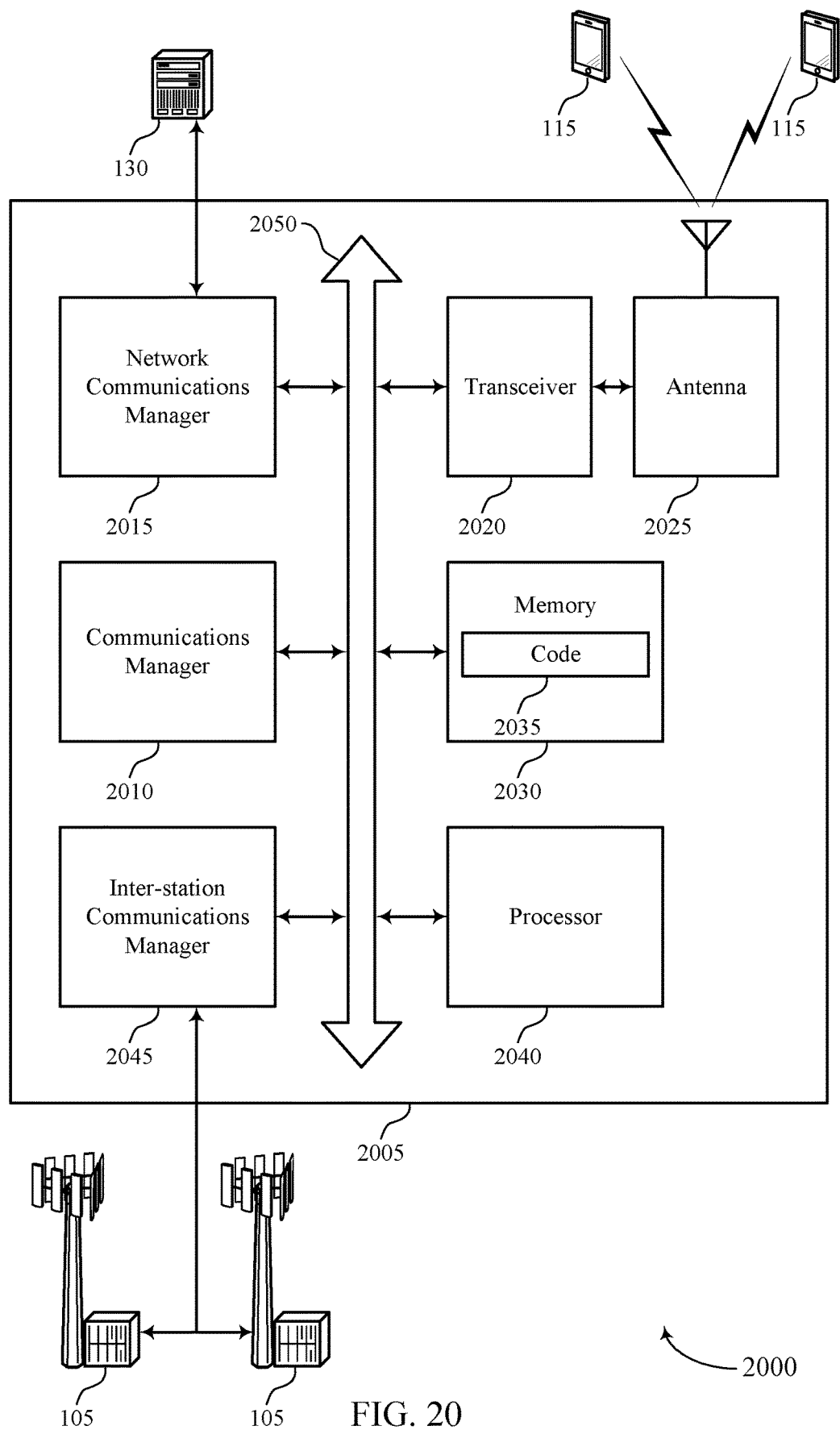
FIG. 20 shows a diagram of a system including a device that supports synchronization signal block and remaining minimum system information integration in unlicensed systems in accordance with aspects of the present disclosure.

FIG. 20 shows a diagram of a system 2000 including a device 2005 that supports synchronization signal block and remaining minimum system information integration in unlicensed systems in accordance with aspects of the present disclosure. The device 2005 may be an example of or include the components of device 1705, device 1805, or a base station 105 as described herein. The device 2005 may include components for bi-directional voice and data communications including components for transmitting and receiving communications, including a communications manager 2010, a network communications manager 2015, a transceiver 2020, an antenna 2025, memory 2030, a processor 2040, and an inter-station communications manager 2045. These components may be in electronic communication via one or more buses (e.g., bus 2050).

The communications manager 2010 may transmit a control resource set including a grant for a downlink shared channel carrying system information, transmit, to a UE, an SSB of an SSB burst in a slot, where the control resource set is transmitted adjacent to a previous SSB of the SSB burst and before the transmitted SSB, and transmit, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB. The communications manager 2010 may also transmit an SSB burst including a set of SSBs, determine whether to transmit a set of RMSI blocks adjacent to the SSB burst in time, where the set of RMSI blocks are inverse-respectively quasi co-located with the set of SSBs, and transmit an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted. The communications manager 2010 may also identify a high priority signal, configure a rate matching resource set to include time and frequency domain resources used for SSB transmission, transmit a downlink grant to a UE including a bit to indicate downlink shared channel rate matching, refrain from transmitting an SSB based on the identified high priority signal, and transmit the high priority signal from the base station on resources of the SSB.

The network communications manager 2015 may manage communications with the core network (e.g., via one or more wired backhaul links). For example, the network communications manager 2015 may manage the transfer of data communications for client devices, such as one or more UEs 115.

The transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some cases, the wireless device may include a single antenna 2025. However, in some cases the device may have more than one antenna 2025, which may be capable of concurrently transmitting or receiving multiple wireless transmissions.

The memory 2030 may include RAM, ROM, or a combination thereof. The memory 2030 may store computer-readable code 2035 including instructions that, when executed by a processor (e.g., the processor 2040) cause the device to perform various functions described herein. In some cases, the memory 2030 may contain, among other things, a BIOS which may control basic hardware or software operation such as the interaction with peripheral components or devices.

The processor 2040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2040 may be configured to operate a memory array using a memory controller. In some cases, a memory controller may be integrated into processor 2040. The processor 2040 may be configured to execute computer-readable instructions stored in a memory (e.g., the memory 2030) to cause the device 2005 to perform various functions (e.g., functions or tasks supporting synchronization signal block and remaining minimum system information integration in unlicensed systems).

The inter-station communications manager 2045 may manage communications with other base station 105 and may include a controller or scheduler for controlling communications with UEs 115 in cooperation with other base stations 105. For example, the inter-station communications manager 2045 may coordinate scheduling for transmissions to UEs 115 for various interference mitigation techniques such as beamforming or joint transmission. In some examples, the inter-station communications manager 2045 may provide an X2 interface within an LTE/LTE-A wireless communication network technology to provide communication between base stations 105.

The code 2035 may include instructions to implement aspects of the present disclosure, including instructions to support wireless communications. The code 2035 may be stored in a non-transitory computer-readable medium such as system memory or other type of memory. In some cases, the code 2035 may not be directly executable by the processor 2040 but may cause a computer (e.g., when compiled and executed) to perform functions described herein.

Figure 21:
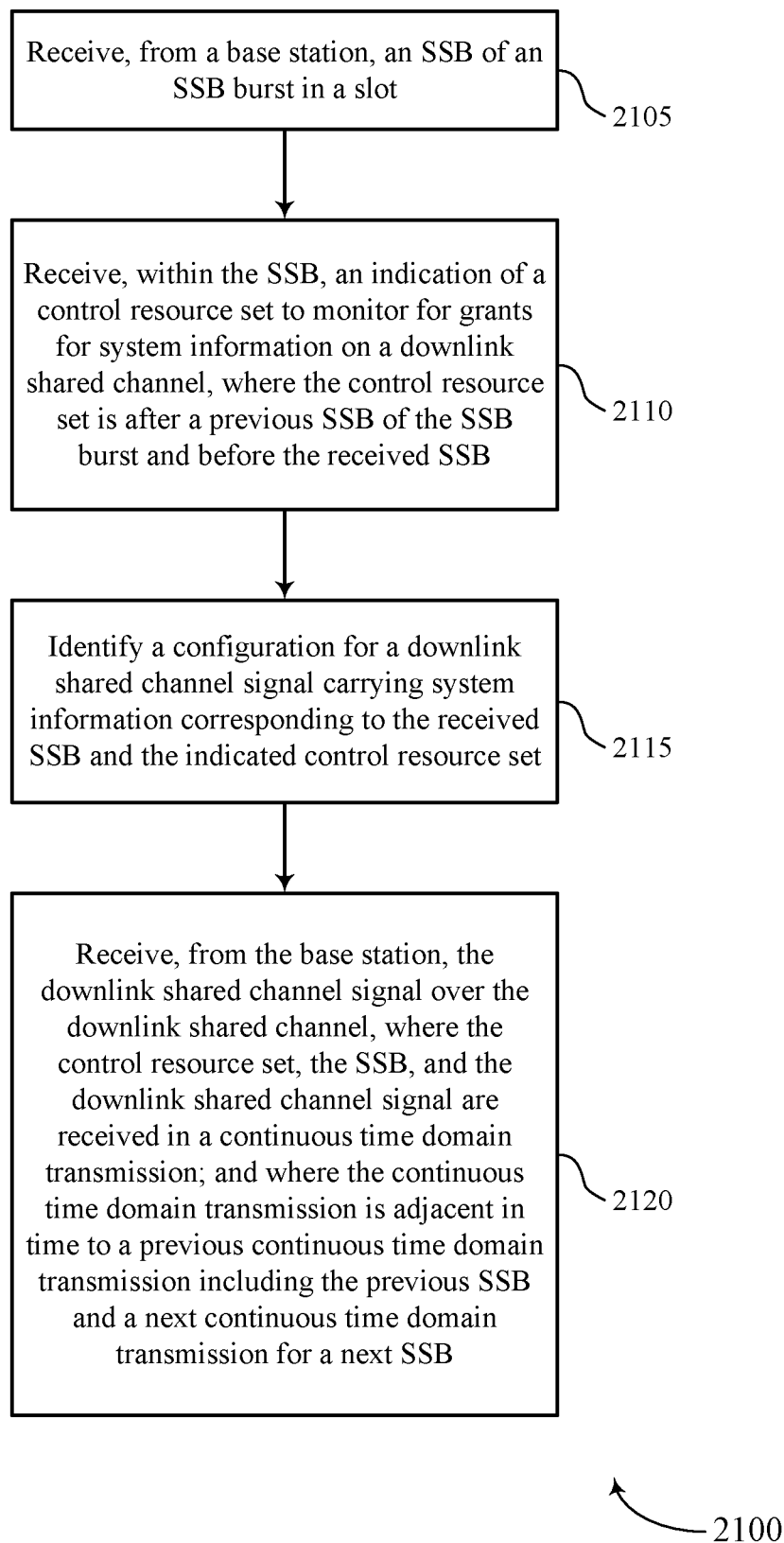
FIGS. 21 through 26 show flowcharts illustrating methods that support synchronization signal block and remaining minimum system information integration in unlicensed systems in accordance with aspects of the present disclosure.

FIG. 21 shows a flowchart illustrating a method 2100 that supports synchronization signal block and remaining minimum system information integration in unlicensed systems in accordance with aspects of the present disclosure. The operations of method 2100 may be implemented by a UE 115 or its components as described herein. For example, the operations of method 2100 may be performed by a communications manager as described with reference to FIGS. 13 through 16. In some examples, a UE may execute a set of instructions to control the functional elements of the UE to perform the functions described below. Additionally, or alternatively, a UE may perform aspects of the functions described below using special-purpose hardware.

At 2105, the UE may receive, from a base station, an SSB of an SSB burst in a slot. The operations of 2105 may be performed according to the methods described herein. In some examples, aspects of the operations of 2105 may be performed by a SSB burst component as described with reference to FIGS. 13 through 16.

At 2110, the UE may receive, within the SSB, an indication of a control resource set to monitor for grants for system information on a downlink shared channel, where the control resource set is after a previous SSB of the SSB burst and before the received SSB. The operations of 2110 may be performed according to the methods described herein. In some examples, aspects of the operations of 2110 may be performed by a control resource set component as described with reference to FIGS. 13 through 16.

At 2115, the UE may identify a configuration for a downlink shared channel signal carrying system information corresponding to the received SSB and the indicated control resource set. The operations of 2115 may be performed according to the methods described herein. In some examples, aspects of the operations of 2115 may be performed by a configuration component as described with reference to FIGS. 13 through 16.

At 2120, the UE may receive, from the base station, the downlink shared channel signal over the downlink shared channel, where the control resource set, the SSB, and the downlink shared channel signal are received in a continuous time domain transmission; and where the continuous time domain transmission is adjacent in time to a previous continuous time domain transmission including the previous SSB and a next continuous time domain transmission for a next SSB. The operations of 2120 may be performed according to the methods described herein. In some examples, aspects of the operations of 2120 may be performed by a downlink shared channel signal receiving component as described with reference to FIGS. 13 through 16.

Figure 22:
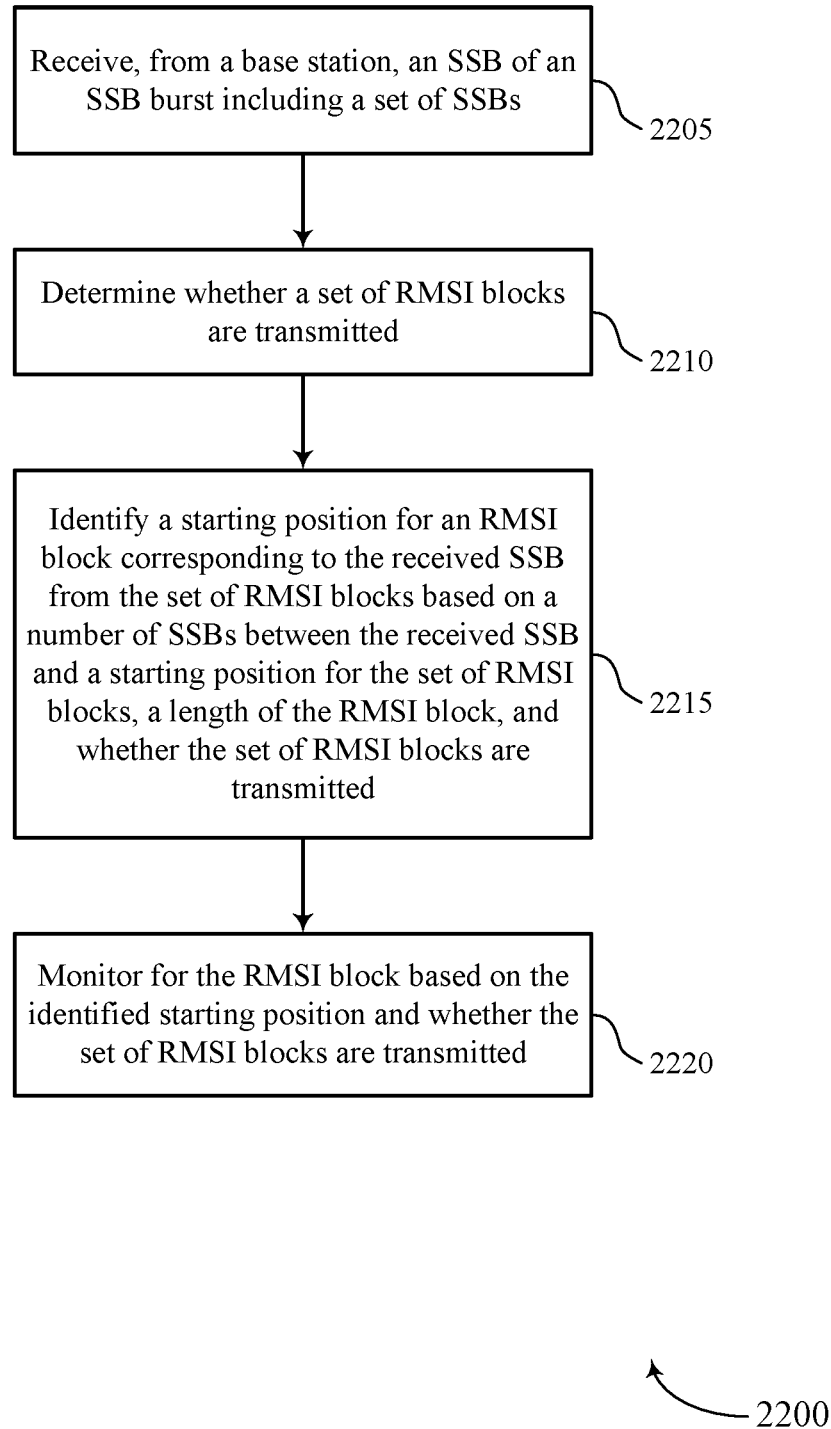

FIG. 22 shows a flowchart illustrating a method 2200 that supports synchronization signal block and remaining minimum system information integration in unlicensed systems in accordance with aspects of the present disclosure. The operations of method 2200 may be implemented by a UE 115 or its components as described herein. For example, the operations of method 2200 may be performed by a communications manager as described with reference to FIGS. 13 through 16. In some examples, a UE may execute a set of instructions to control the functional elements of the UE to perform the functions described below. Additionally, or alternatively, a UE may perform aspects of the functions described below using special-purpose hardware.

At 2205, the UE may receive, from a base station, an SSB of an SSB burst including a set of SSBs. The operations of 2205 may be performed according to the methods described herein. In some examples, aspects of the operations of 2205 may be performed by a SSB burst component as described with reference to FIGS. 13 through 16.

At 2210, the UE may determine whether a set of RMSI blocks are transmitted. The operations of 2210 may be performed according to the methods described herein. In some examples, aspects of the operations of 2210 may be performed by a RMSI block component as described with reference to FIGS. 13 through 16.

At 2215, the UE may identify a starting position for an RMSI block corresponding to the received SSB from the set of RMSI blocks based on a number of SSBs between the received SSB and a starting position for the set of RMSI blocks, a length of the RMSI block, and whether the set of RMSI blocks are transmitted. The operations of 2215 may be performed according to the methods described herein. In some examples, aspects of the operations of 2215 may be performed by a starting position identifying component as described with reference to FIGS. 13 through 16.

At 2220, the UE may monitor for the RMSI block based on the identified starting position and whether the set of RMSI blocks are transmitted. The operations of 2220 may be performed according to the methods described herein. In some examples, aspects of the operations of 2220 may be performed by a monitoring component as described with reference to FIGS. 13 through 16.

Figure 23:
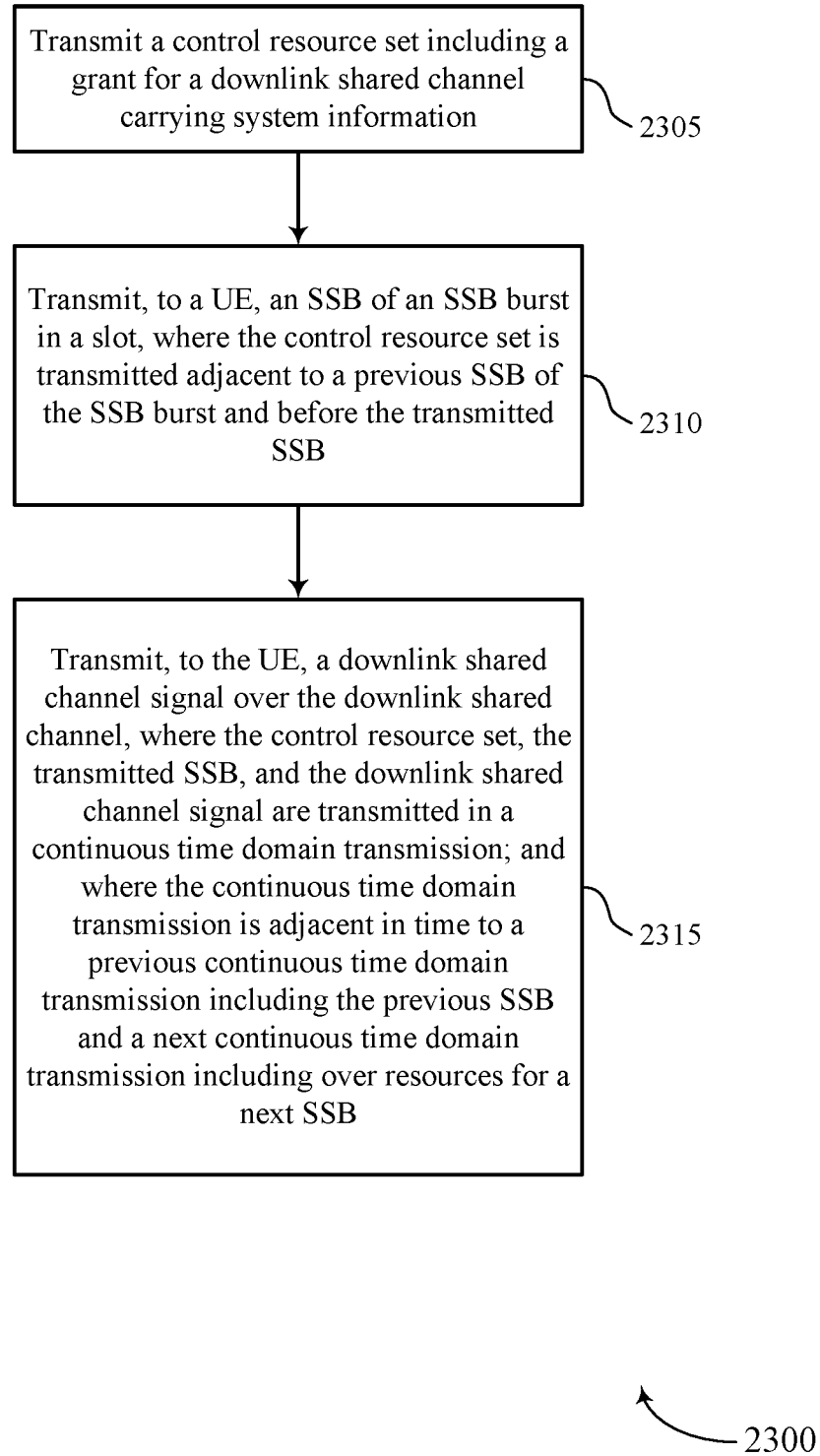

FIG. 23 shows a flowchart illustrating a method 2300 that supports synchronization signal block and remaining minimum system information integration in unlicensed systems in accordance with aspects of the present disclosure. The operations of method 2300 may be implemented by a base station 105 or its components as described herein. For example, the operations of method 2300 may be performed by a communications manager as described with reference to FIGS. 17 through 20. In some examples, a base station may execute a set of instructions to control the functional elements of the base station to perform the functions described below. Additionally, or alternatively, a base station may perform aspects of the functions described below using special-purpose hardware.

At 2305, the base station may transmit a control resource set including a grant for a downlink shared channel carrying system information. The operations of 2305 may be performed according to the methods described herein. In some examples, aspects of the operations of 2305 may be performed by a control resource set component as described with reference to FIGS. 17 through 20.

At 2310, the base station may transmit, to a UE, an SSB of an SSB burst in a slot, where the control resource set is transmitted adjacent to a previous SSB of the SSB burst and before the transmitted SSB. The operations of 2310 may be performed according to the methods described herein. In some examples, aspects of the operations of 2310 may be performed by a SSB transmitting component as described with reference to FIGS. 17 through 20.

At 2315, the base station may transmit, to the UE, a downlink shared channel signal over the downlink shared channel, where the control resource set, the transmitted SSB, and the downlink shared channel signal are transmitted in a continuous time domain transmission; and where the continuous time domain transmission is adjacent in time to a previous continuous time domain transmission including the previous SSB and a next continuous time domain transmission including a next SSB. The operations of 2315 may be performed according to the methods described herein. In some examples, aspects of the operations of 2315 may be performed by a downlink shared channel signal transmitting component as described with reference to FIGS. 17 through 20.

Figure 24:
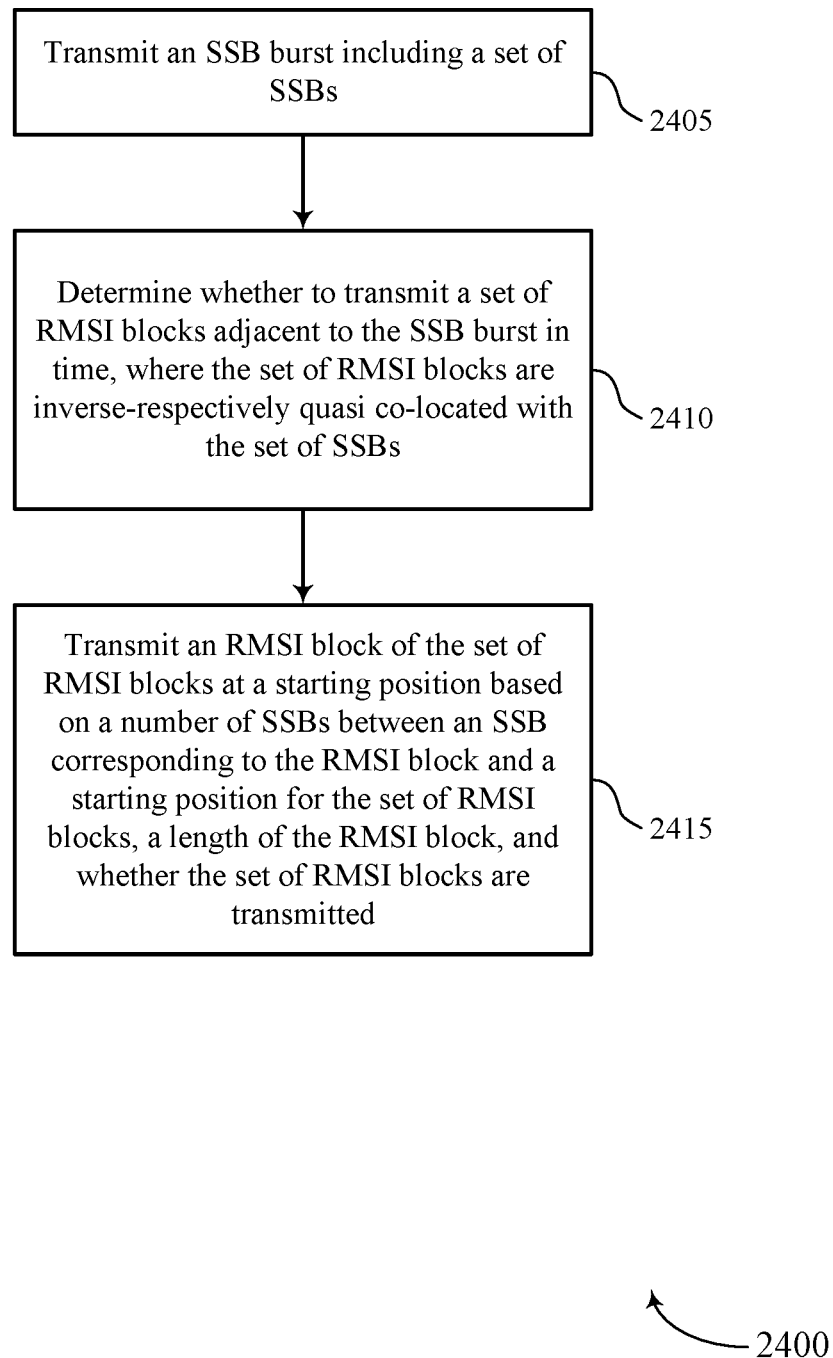

FIG. 24 shows a flowchart illustrating a method 2400 that supports synchronization signal block and remaining minimum system information integration in unlicensed systems in accordance with aspects of the present disclosure. The operations of method 2400 may be implemented by a base station 105 or its components as described herein. For example, the operations of method 2400 may be performed by a communications manager as described with reference to FIGS. 17 through 20. In some examples, a base station may execute a set of instructions to control the functional elements of the base station to perform the functions described below. Additionally, or alternatively, a base station may perform aspects of the functions described below using special-purpose hardware.

At 2405, the base station may transmit an SSB burst including a set of SSBs. The operations of 2405 may be performed according to the methods described herein. In some examples, aspects of the operations of 2405 may be performed by a SSB burst component as described with reference to FIGS. 17 through 20.

At 2410, the base station may determine whether to transmit a set of RMSI blocks adjacent to the SSB burst in time, where the set of RMSI blocks are inverse-respectively quasi co-located with the set of SSBs. The operations of 2410 may be performed according to the methods described herein. In some examples, aspects of the operations of 2410 may be performed by a RMSI block burst configuration component as described with reference to FIGS. 17 through 20.

At 2415, the base station may transmit an RMSI block of the set of RMSI blocks at a starting position based on a number of SSBs between an SSB corresponding to the RMSI block and a starting position for the set of RMSI blocks, a length of the RMSI block, and whether the set of RMSI blocks are transmitted. The operations of 2415 may be performed according to the methods described herein. In some examples, aspects of the operations of 2415 may be performed by a RMSI block transmitting component as described with reference to FIGS. 17 through 20.

Figure 25:
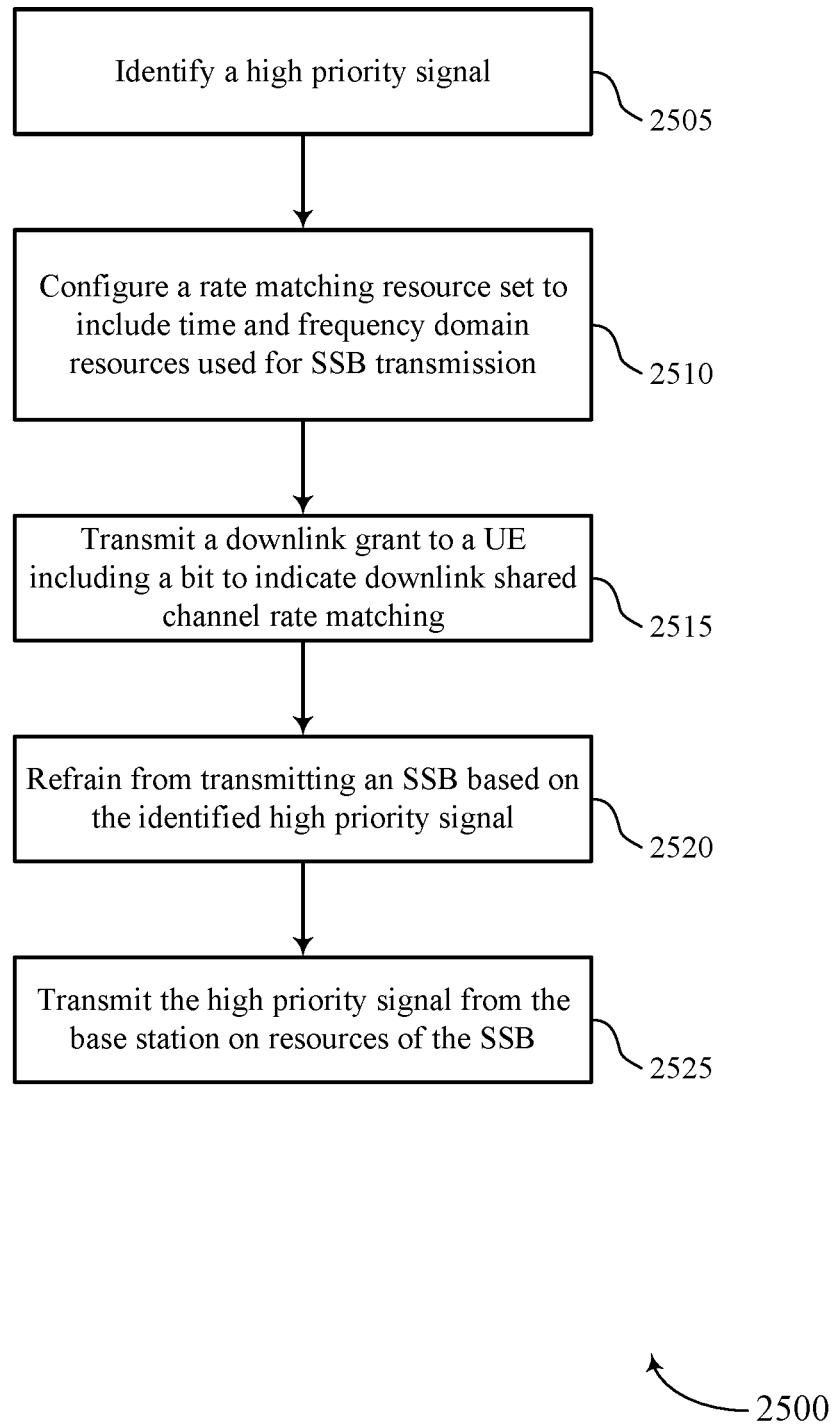

FIG. 25 shows a flowchart illustrating a method 2500 that supports synchronization signal block and remaining minimum system information integration in unlicensed systems in accordance with aspects of the present disclosure. The operations of method 2500 may be implemented by a base station 105 or its components as described herein. For example, the operations of method 2500 may be performed by a communications manager as described with reference to FIGS. 17 through 20. In some examples, a base station may execute a set of instructions to control the functional elements of the base station to perform the functions described below. Additionally, or alternatively, a base station may perform aspects of the functions described below using special-purpose hardware.

At 2505, the base station may identify a high priority signal. The operations of 2505 may be performed according to the methods described herein. In some examples, aspects of the operations of 2505 may be performed by a high priority signal identifying component as described with reference to FIGS. 17 through 20.

At 2510, the base station may configure a rate matching resource set to include time and frequency domain resources used for SSB transmission. The operations of 2510 may be performed according to the methods described herein. In some examples, aspects of the operations of 2510 may be performed by a rate matching configuring component as described with reference to FIGS. 17 through 20.

At 2515, the base station may transmit a downlink grant to a UE including a bit to indicate downlink shared channel rate matching. The operations of 2515 may be performed according to the methods described herein. In some examples, aspects of the operations of 2515 may be performed by a rate matching indicating component as described with reference to FIGS. 17 through 20.

At 2520, the base station may refrain from transmitting an SSB based on the identified high priority signal. The operations of 2520 may be performed according to the methods described herein. In some examples, aspects of the operations of 2520 may be performed by a transmission refraining component as described with reference to FIGS. 17 through 20.

At 2525, the base station may transmit the high priority signal from the base station on resources of the SSB. The operations of 2525 may be performed according to the methods described herein. In some examples, aspects of the operations of 2525 may be performed by a high priority signal transmitting component as described with reference to FIGS. 17 through 20.

Figure 26:
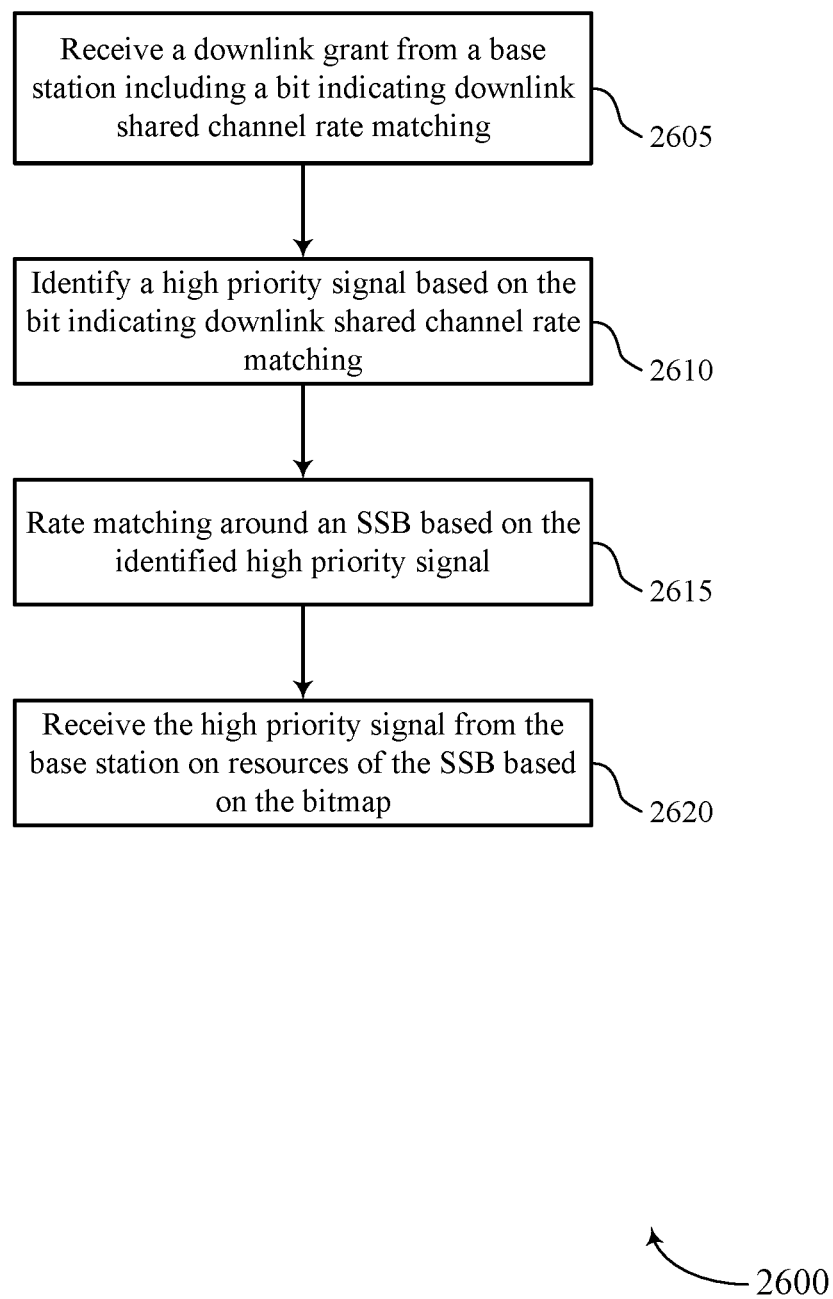

FIG. 26 shows a flowchart illustrating a method 2600 that supports synchronization signal block and remaining minimum system information integration in unlicensed systems in accordance with aspects of the present disclosure. The operations of method 2600 may be implemented by a UE 115 or its components as described herein. For example, the operations of method 2600 may be performed by a communications manager as described with reference to FIGS. 13 through 16. In some examples, a UE may execute a set of instructions to control the functional elements of the UE to perform the functions described below. Additionally, or alternatively, a UE may perform aspects of the functions described below using special-purpose hardware.

At 2605, the UE may receive a downlink grant from a base station including a bit indicating downlink shared channel rate matching. The operations of 2605 may be performed according to the methods described herein. In some examples, aspects of the operations of 2605 may be performed by a rate matching configuring component as described with reference to FIGS. 13 through 16.

At 2610, the UE may identify a high priority signal based on the bit indicating downlink shared channel rate matching. The operations of 2610 may be performed according to the methods described herein. In some examples, aspects of the operations of 2610 may be performed by a high priority signal identifying component as described with reference to FIGS. 13 through 16.

At 2615, the UE may rate matching around an SSB based on the identified high priority signal. The operations of 2615 may be performed according to the methods described herein. In some examples, aspects of the operations of 2615 may be performed by a rate matching component as described with reference to FIGS. 13 through 16.

At 2620, the UE may receive the high priority signal from the base station on resources of the SSB based on the bitmap. The operations of 2620 may be performed according to the methods described herein. In some examples, aspects of the operations of 2620 may be performed by a high priority signal receiving component as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, a synchronization signal block (SSB) of an SSB burst in a slot;
   receiving, within the SSB, an indication of a control resource set to monitor for grants for system information on a downlink shared channel and an indication of a configuration for a downlink shared channel signal carrying the system information, wherein the control resource set is after a previous SSB of the SSB burst and before the received SSB; and
   receiving, from the base station, the downlink shared channel signal over the downlink shared channel through a last symbol period of the slot, wherein the control resource set, the SSB, and the downlink shared channel signal are received in a continuous time domain transmission; and wherein the continuous time domain transmission is adjacent in time to a previous continuous time domain transmission comprising the previous SSB and a next continuous time domain transmission for a next SSB.

2. The method of claim 1, further comprising:
   receiving the control resource set in a first and a second symbol period before the received SSB, wherein the first and second symbol period are adjacent to the previous SSB in time.

3. The method of claim 1, further comprising:
   receiving the downlink shared channel signal starting from a first symbol period of the received SSB through the last symbol period of the slot.

4. The method of claim 3, wherein the downlink shared channel signal carrying system information is frequency division multiplexed with the received SSB.

5. The method of claim 1, further comprising:
   receiving the downlink shared channel signal starting from a first symbol period after the received SSB through the last symbol period of the slot.

6. The method of claim 5, wherein the downlink shared channel signal carrying system information is time division multiplexed with the received SSB.

7. The method of claim 1, further comprising:
   receiving the downlink shared channel signal starting from a first symbol period of the received SSB until a first symbol period of the next SSB.

8. The method of claim 1, wherein the downlink shared channel signal comprises remaining minimum system information (RMSI).

9. The method of claim 1, wherein a resource size for the downlink shared channel is configurable.

10. The method of claim 1, wherein the received SSB and the previous SSB each have an even SSB index or an odd SSB index.

11. An apparatus for wireless communications at a user equipment (UE), comprising: a processor, memory in electronic communication with the processor; and instructions stored in the memory and executable by the processor to cause the apparatus to:
    receive, from a base station, a synchronization signal block (SSB) of an SSB burst in a slot;
    receive, within the SSB, an indication of a control resource set to monitor for grants for system information on a downlink shared channel and an indication of a configuration for a downlink shared channel signal carrying the system information, wherein the control resource set is after a previous SSB of the SSB burst and before the received SSB; and
    receive, from the base station, the downlink shared channel signal over the downlink shared channel through a last symbol period of the slot, wherein the control resource set, the SSB, and the downlink shared channel signal are received in a continuous time domain transmission; and wherein the continuous time domain transmission is adjacent in time to a previous continuous time domain transmission comprising the previous SSB and a next continuous time domain transmission for a next SSB.

12. The apparatus of claim 11, wherein the instructions are further executable by the processor to cause the apparatus to:
    receive the control resource set in a first and a second symbol period before the received SSB, wherein the first and second symbol period are adjacent to the previous SSB in time.

13. The apparatus of claim 11, wherein the instructions are further executable by the processor to cause the apparatus to:
    receive the downlink shared channel signal starting from a first symbol period of the received SSB through the last symbol period of the slot.

14. The apparatus of claim 13, wherein the downlink shared channel signal carrying system information is frequency division multiplexed with the received SSB.

15. The apparatus of claim 11, wherein the instructions are further executable by the processor to cause the apparatus to:
    receive the downlink shared channel signal starting from a first symbol period after the received SSB through the last symbol period of the slot.

16. The apparatus of claim 15, wherein the downlink shared channel signal carrying system information is time division multiplexed with the received SSB.

17. The apparatus of claim 11, wherein the instructions are further executable by the processor to cause the apparatus to:
    receive the downlink shared channel signal starting from a first symbol period of the received SSB until a first symbol period of the next SSB.

18. The apparatus of claim 11, wherein the downlink shared channel signal comprises remaining minimum system information (RMSI).

19. The apparatus of claim 11, wherein a resource size for the downlink shared channel is configurable.

20. The apparatus of claim 11, wherein the received SSB and the previous SSB each have an even SSB index or an odd SSB index.

21. An apparatus for wireless communications at a user equipment (UE), comprising:
    means for receiving, from a base station, a synchronization signal block (SSB) of an SSB burst in a slot;
    means for receiving, within the SSB, an indication of a control resource set to monitor for grants for system information on a downlink shared channel and an indication of a configuration for a downlink shared channel signal carrying the system information, wherein the control resource set is after a previous SSB of the SSB burst and before the received SSB; and
    means for receiving, from the base station, the downlink shared channel signal over the downlink shared channel through a last symbol period of the slot, wherein the control resource set, the SSB, and the downlink shared channel signal are received in a continuous time domain transmission; and wherein the continuous time domain transmission is adjacent in time to a previous continuous time domain transmission comprising the previous SSB and a next continuous time domain transmission for a next SSB.

22. The apparatus of claim 21, further comprising:
means for receiving the control resource set in a first and a second symbol period before the received SSB, wherein the first and second symbol period are adjacent to the previous SSB in time.

23. The apparatus of claim 21, wherein the means for receiving the downlink shared channel signal comprise:
means for receiving the downlink shared channel signal starting from a first symbol period of the received SSB through the last symbol period of the slot.

24. A non-transitory computer-readable medium storing code for wireless communications at a user equipment (UE), the code comprising instructions executable by a processor to:
receive, from a base station, a synchronization signal block (SSB) of an SSB burst in a slot;
receive, within the SSB, an indication of a control resource set to monitor for grants for system information on a downlink shared channel and an indication of a configuration for a downlink shared channel signal carrying the system information, wherein the control resource set is after a previous SSB of the SSB burst and before the received SSB; and
receive, from the base station, the downlink shared channel signal over the downlink shared channel through a last symbol period of the slot, wherein the control resource set, the SSB, and the downlink shared channel signal are received in a continuous time domain transmission; and wherein the continuous time domain transmission is adjacent in time to a previous continuous time domain transmission comprising the previous SSB and a next continuous time domain transmission for a next SSB.

25. The non-transitory computer-readable medium of claim 21, wherein the instructions are further executable by the processor to:
receive the control resource set in a first and a second symbol period before the received SSB, wherein the first and second symbol period are adjacent to the previous SSB in time.

26. The non-transitory computer-readable medium of claim 21, wherein the instructions to receive the downlink shared channel signal are executable by the processor to:
receive the downlink shared channel signal starting from a first symbol period of the received SSB through the last symbol period of the slot.

* * * * *